(12) United States Patent
Nemoto et al.

(10) Patent No.: US 10,095,410 B2
(45) Date of Patent: Oct. 9, 2018

(54) MEMORY SYSTEM WITH GARBAGE COLLECTION

(71) Applicant: Toshiba Memory Corporation, Minato-ku, Tokyo (JP)

(72) Inventors: Hiroyuki Nemoto, Yokohama Kanagawa (JP); Kazuya Kitsunai, Fujisawa Kanagawa (JP); Yoshihisa Kojima, Kawasaki Kanagawa (JP); Katsuhiko Ueki, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/819,474

(22) Filed: Nov. 21, 2017

(65) Prior Publication Data

US 2018/0088828 A1    Mar. 29, 2018

Related U.S. Application Data

(63) Continuation of application No. 14/757,559, filed on Dec. 24, 2015, now Pat. No. 9,857,984.

(30) Foreign Application Priority Data

Dec. 24, 2014  (JP) ................ 2014-259951

(51) Int. Cl.
| | | |
|---|---|---|
| G06F 12/00 | (2006.01) | |
| G06F 13/00 | (2006.01) | |
| G06F 3/06 | (2006.01) | |
| G06F 13/16 | (2006.01) | |

(52) U.S. Cl.
CPC .......... *G06F 3/0608* (2013.01); *G06F 3/0604* (2013.01); *G06F 3/0644* (2013.01); *G06F 3/0679* (2013.01); *G06F 13/1605* (2013.01); *Y02B 60/1228* (2013.01); *Y02D 10/14* (2018.01)

(58) Field of Classification Search
None
See application file for complete search history.

(56) References Cited

U.S. PATENT DOCUMENTS

| | | | |
|---|---|---|---|
| 8,683,148 B2 | 3/2014 | Raz et al. | |
| 9,778,849 B2* | 10/2017 | Yum | ........................ G06F 3/061 |
| 2008/0082728 A1 | 4/2008 | Traister et al. | |
| 2008/0201336 A1 | 8/2008 | Yamato | |
| 2008/0307164 A1* | 12/2008 | Sinclair | ............... G06F 12/0246 |
| | | | 711/135 |
| 2013/0246688 A1 | 9/2013 | Kanno et al. | |
| 2013/0290619 A1 | 10/2013 | Knight | |
| 2015/0268860 A1* | 9/2015 | Yum | ........................ G06F 3/061 |
| | | | 711/154 |
| 2015/0347025 A1* | 12/2015 | Law | ........................ G06F 3/0611 |
| | | | 711/103 |
| 2016/0041762 A1 | 2/2016 | Kanno et al. | |

(Continued)

*Primary Examiner* — Sean D Rossiter
(74) *Attorney, Agent, or Firm* — White & Case LLP

(57) ABSTRACT

According to one embodiment, a memory system includes a nonvolatile memory, and a controller configured to control the nonvolatile memory. The controller includes an access controller configured to control access to the nonvolatile memory, based on a first request which is issued from a host, and a processor configured to execute a background process for the nonvolatile memory, based on a second request which is issued from the host before the first request is issued.

20 Claims, 21 Drawing Sheets

Information processing system 1 (first embodiment)

(56) References Cited

U.S. PATENT DOCUMENTS

2016/0188220 A1   6/2016   Nemoto et al.
2016/0291872 A1   10/2016  Hashimoto et al.
2017/0160976 A1* 6/2017   Thangaraj ............. G06F 3/0634
2018/0129602 A1* 5/2018   Hsu ..................... G06F 12/0261

* cited by examiner

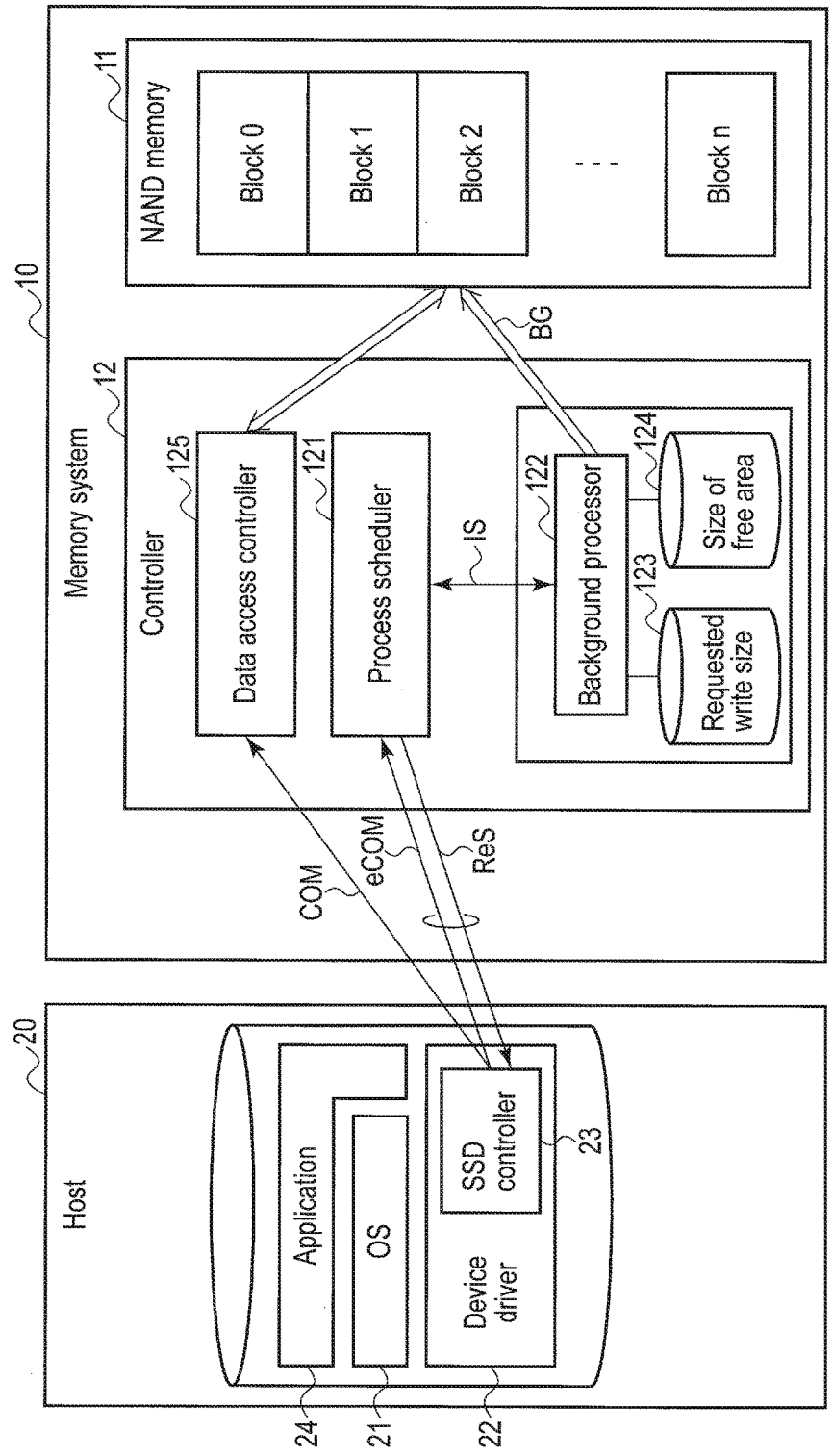
F I G. 1

Write prenotification command eCOM (first embodiment)
| Write size | Write schedule time |
|---|---|
| 10GB | 60sec later |
FIG. 2
Issuance of write prenotification command eCOM
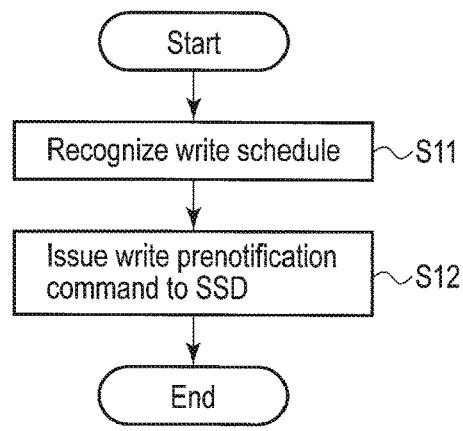
FIG. 3
Issuance of write command COM
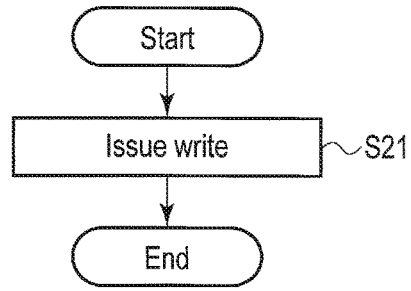
FIG. 4

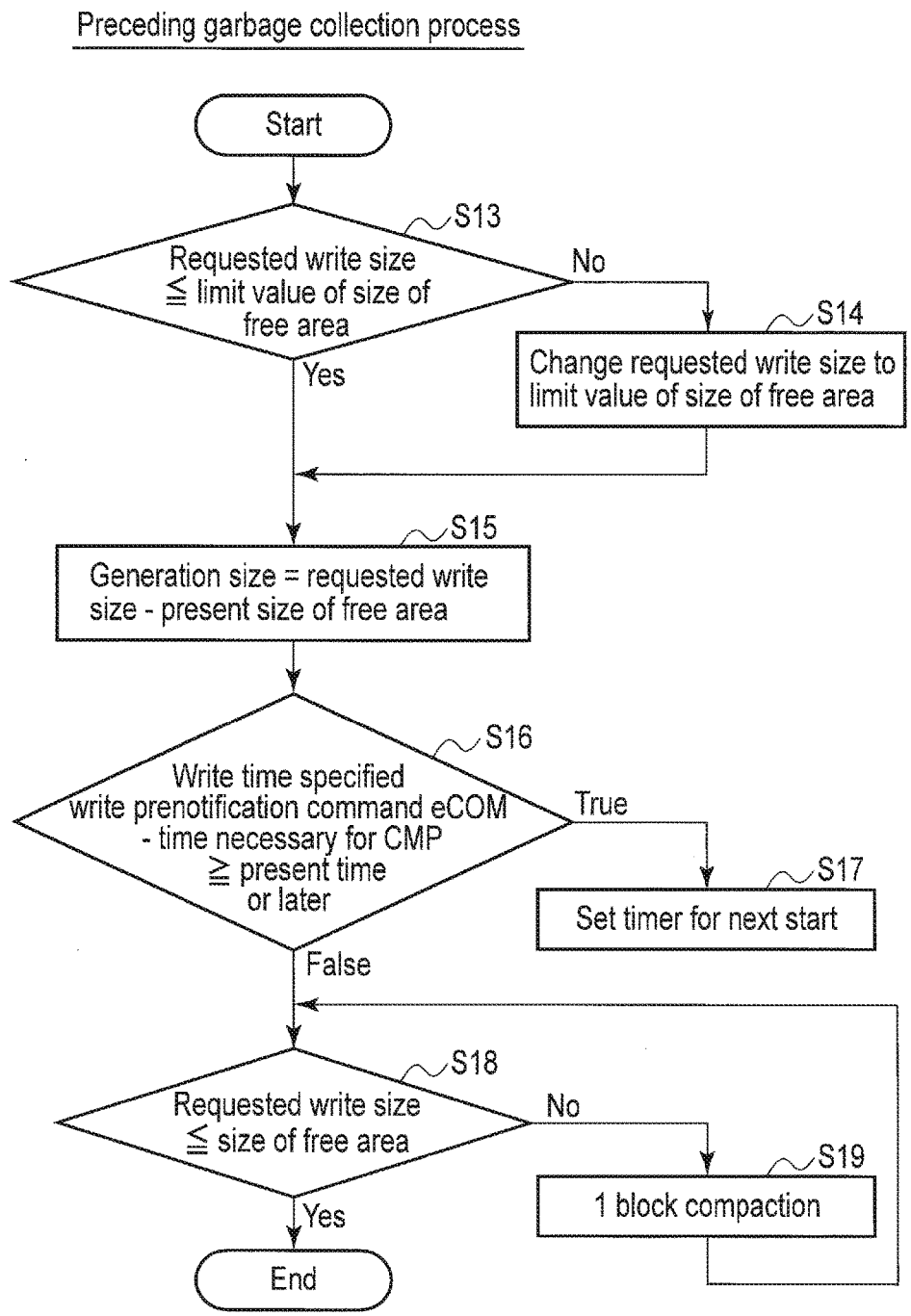
F I G. 5

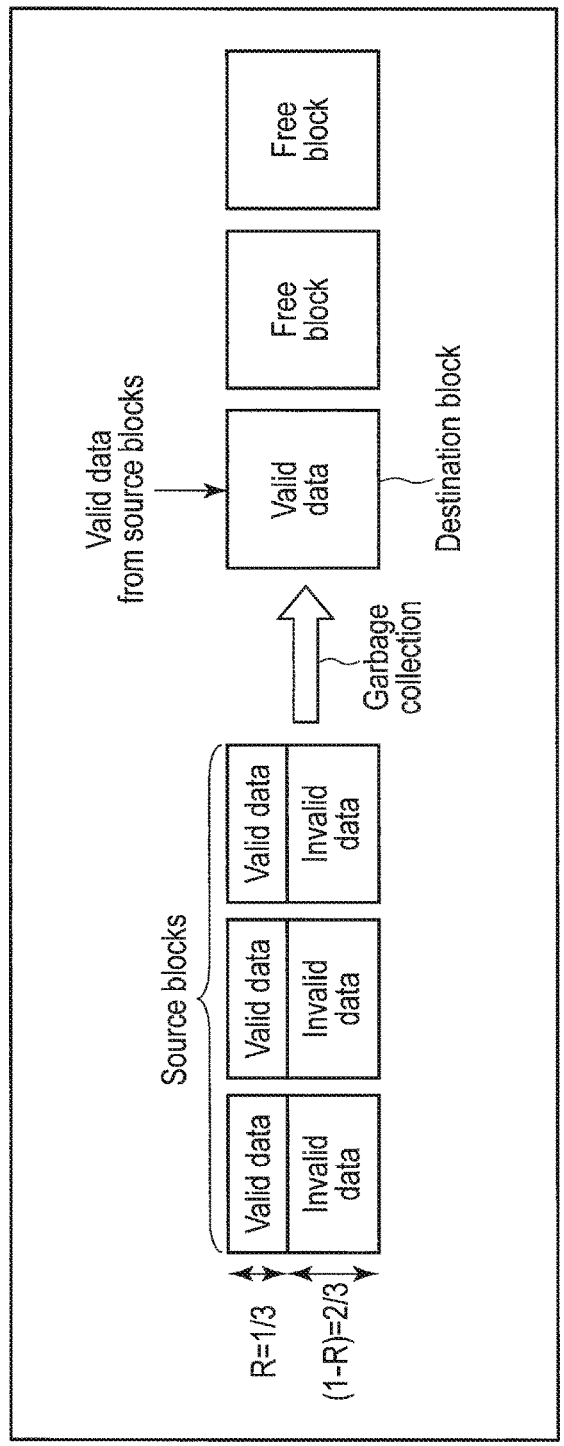
F I G. 5A

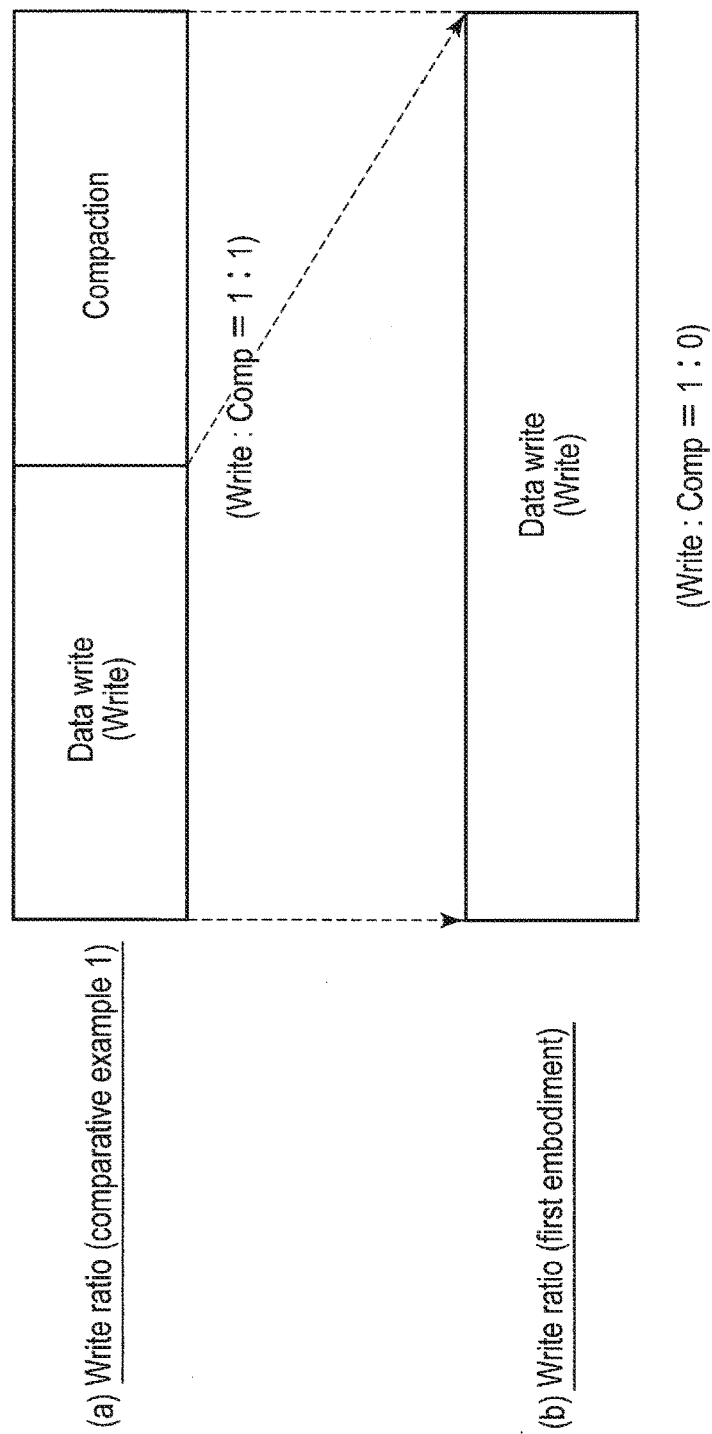
F I G. 10

| | Comparative example 1 | Comparative example 2 | First embodiment |
|---|---|---|---|
| Method of maximizing peak performance | No execution of preceding compaction | Greedy compaction at the discretion of SSD (drive) itself | Preceding compaction by instruction of host 20 |
| Peak performance | Low | High | High |
| Preceding compaction amount | None | Excessively large | Minimum amount necessary for peak performance (host instruction) |
| WAF | Low | Excessively higher compared to first embodiment | Slightly higher compared to comparative example 2 |

F I G. 12

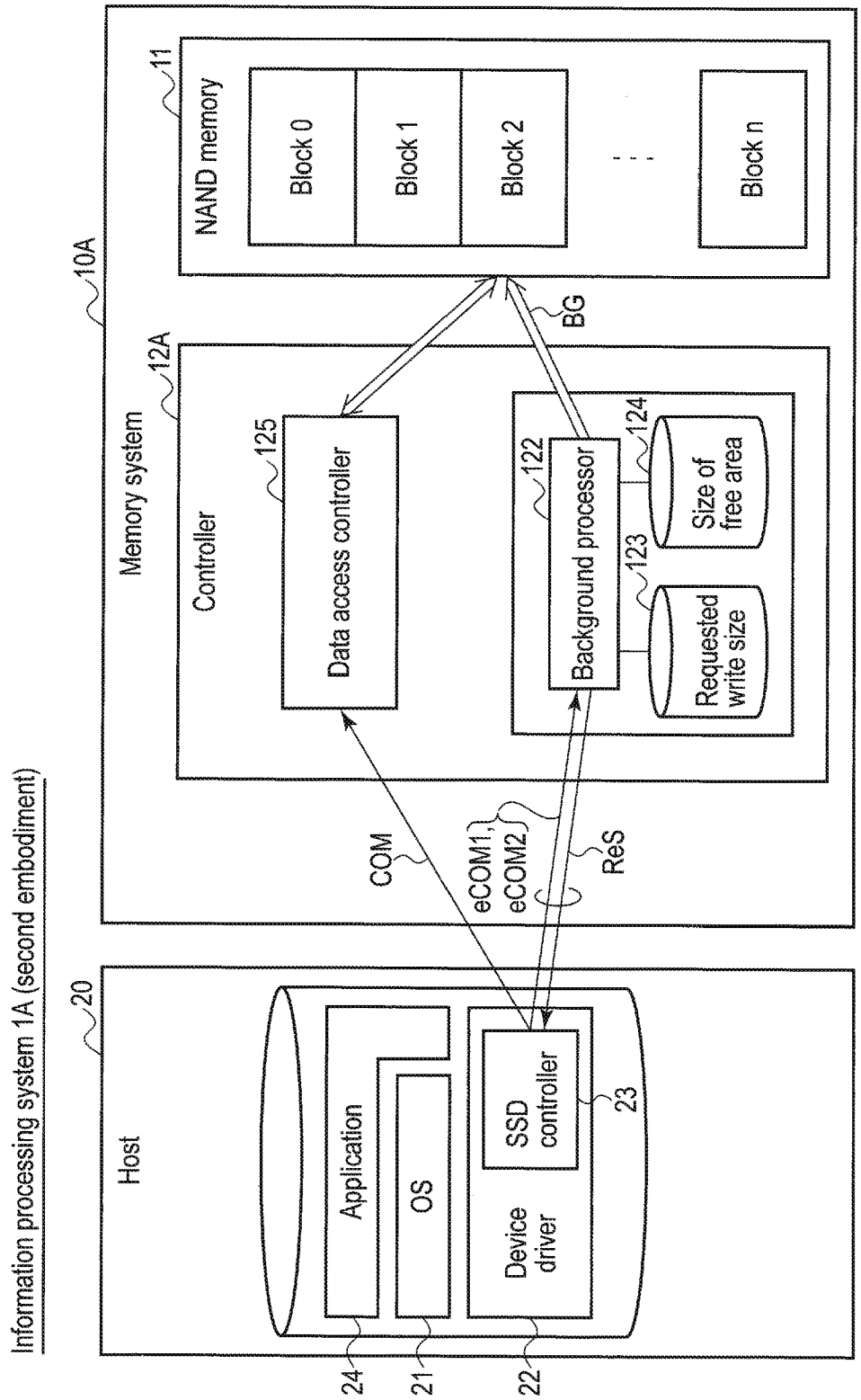
F I G. 13

Control command eCOM1 of preceding execution On/Off

| Control flag of preceding execution On/Off | Requested write size |
|---|---|
| 1 or 0 | 10GB |

F I G. 14A

Request eCOM2 for inquiry of free area
(Host 20 ⇒ SSD 10)

No parameter

F I G. 14B

Response ReS to inquiry of free area
(SSD 10 ⇒ Host 20)

| Size of free area (calculated from the number of free blocks) |
|---|
| 5GB |

F I G. 14C

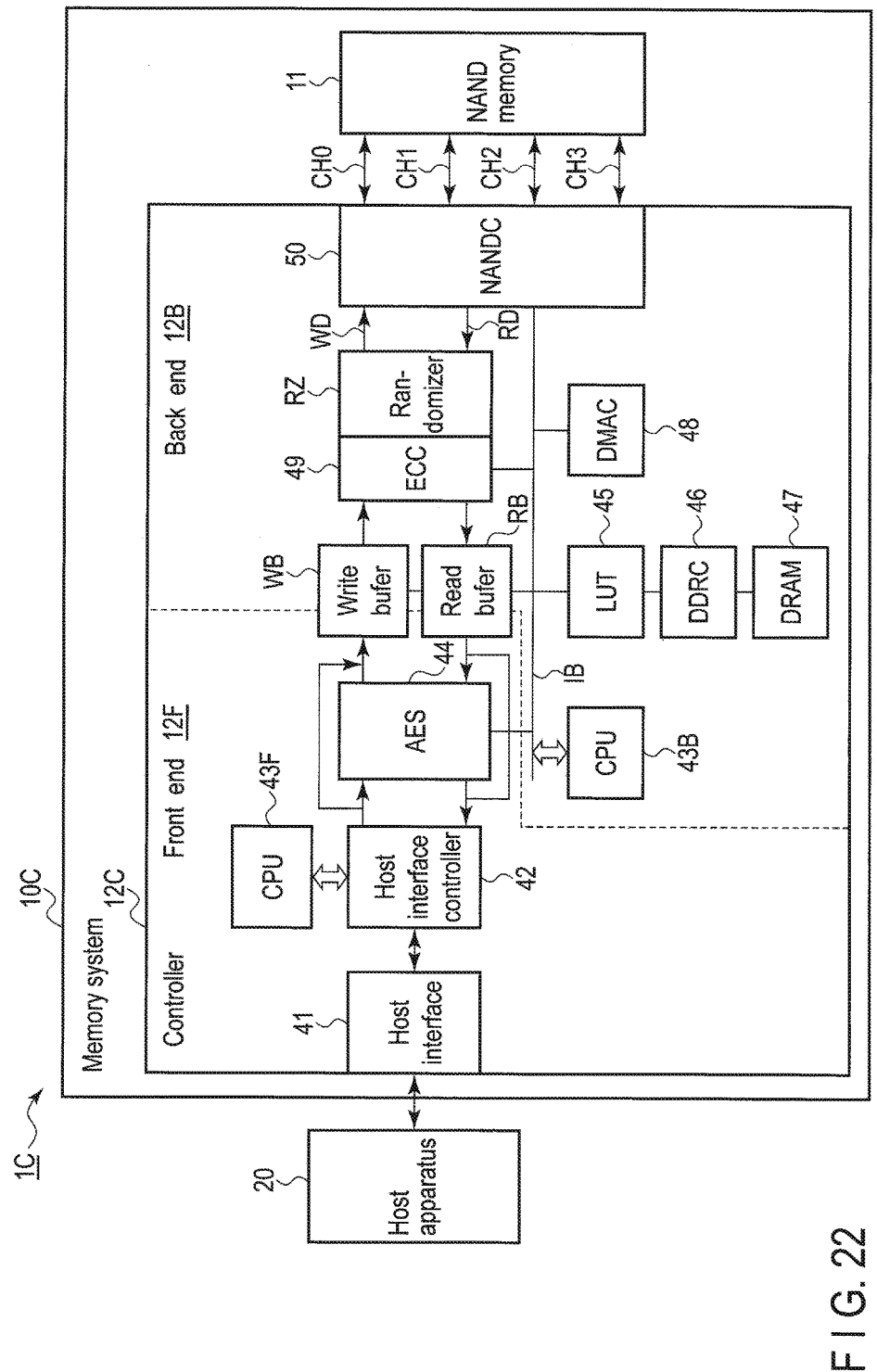
F I G. 22

MEMORY SYSTEM WITH GARBAGE COLLECTION

CROSS-REFERENCE TO RELATED APPLICATIONS

This application is a continuation of application Ser. No. 14/757,559, filed Dec. 24, 2015 and is based upon and claims the benefit of priority from Japanese Patent Application No. 2014-259951, filed Dec. 24, 2014, the entire contents of which are incorporated herein by reference.

FIELD

Embodiments described herein relate generally to a memory system and an information processing system.

BACKGROUND

There is known a memory system including a nonvolatile semiconductor memory and a control function for controlling the semiconductor memory.

BRIEF DESCRIPTION OF THE DRAWINGS

FIG. 1 is a block diagram illustrating a configuration example of an information processing system according to a first embodiment.

FIG. 2 is a view illustrating an example of a command frame of a write prenotification command according to the first embodiment.

FIG. 3 is a flowchart illustrating the issuance of the write prenotification command according to the first embodiment.

FIG. 4 is a flowchart illustrating the issuance of a write command according to the first embodiment.

FIG. 5 is a flowchart illustrating the generation of a free block according to the first embodiment.

FIG. 5A is a block diagram illustrating an algorithm to obtain a time necessary for compaction.

FIG. 10 is a view illustrating a ratio between write by a host and compaction write, part (a) being a view illustrating a write ratio according to comparative example 1, and a part (b) being a view illustrating a write ratio according to the first embodiment.

FIG. 12 is a comparison table illustrating performance of memory systems according to comparative examples 1 and 2 and the first embodiment.

FIG. 13 is a block diagram illustrating a configuration example of an information processing system according to a second embodiment.

FIG. 14A is a view illustrating an example of a command frame of a control command of preceding execution On/Off according to the second embodiment.

FIG. 14B is a view illustrating an example of a command frame of a request for inquiry of a free-area size.

FIG. 14C is a view illustrating an example of a command frame of a response to an inquiry of a free-area size.

FIG. 22 is a block diagram illustrating details of an information processing system according to a third embodiment.

DETAILED DESCRIPTION

Figure 6:
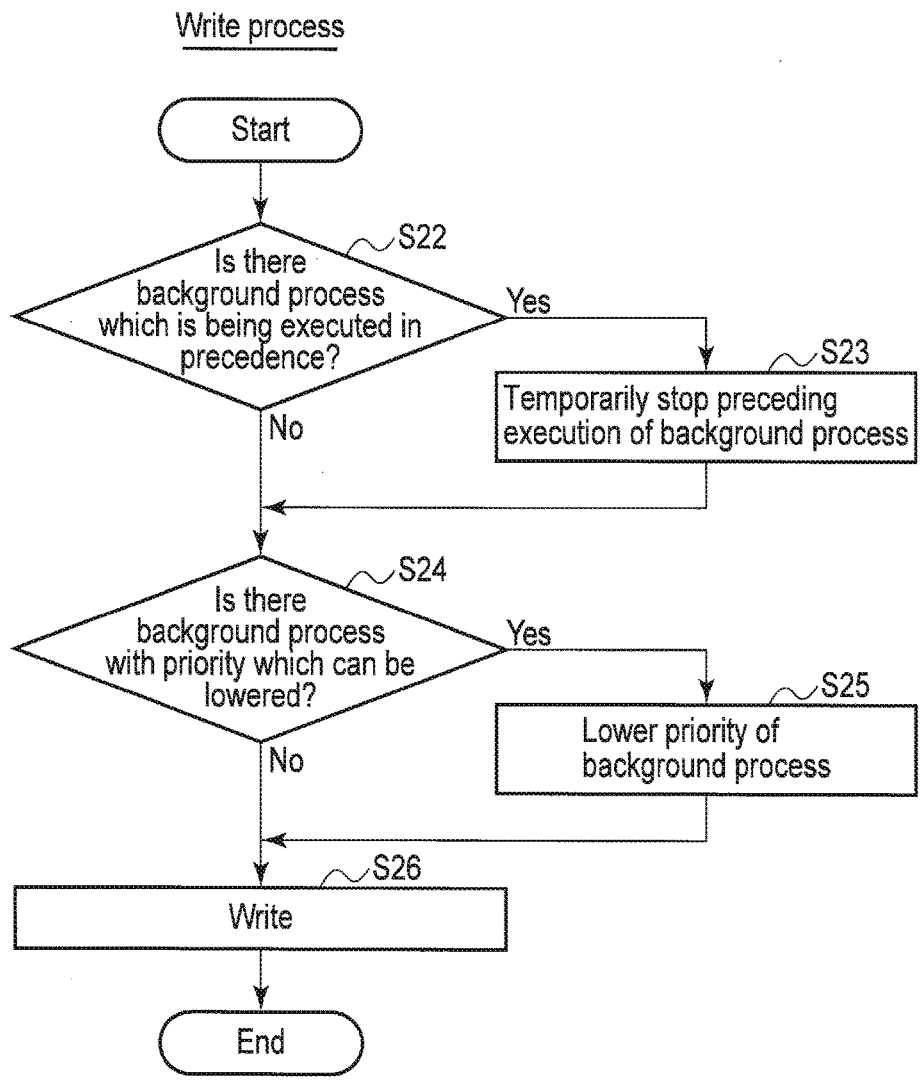
FIG. 6 is a flowchart illustrating a write process according to the first embodiment.

In general, according to one embodiment, a memory system includes a nonvolatile memory, and a controller configured to control the nonvolatile memory. The controller includes an access controller configured to control access to the nonvolatile memory, based on a first request which is issued from an a host; a processor configured to execute garbage collection for securing, on the nonvolatile memory, a free area for writing data in the nonvolatile memory, based on a second request which is issued from the host before the first request is issued; and a scheduler configured to schedule the garbage collection by controlling the processor.

Various embodiments will be described hereinafter with reference to the accompanying drawings.

In the description below, substantially the same functions and elements are denoted by like reference numerals, and a description will be given only where necessary. In addition, in the present specification, a plurality of examples of expression are given to some elements. These examples of expression are merely illustrative examples, and it is not denied that these elements are expressed by other expressions. Besides, an element, to which a plurality of expressions are not given, may be expressed by other expressions.

First Embodiment

1. Configuration

[1-1. Configuration of Information Processing System]

To begin with, referring to FIG. 1, a configuration of an information processing system 1 according to a first embodiment is described. FIG. 1 is a block diagram illustrating a configuration example of the information processing system 1 according to the first embodiment. As illustrated in FIG. 1, the information processing system 1 includes a memory system 10 and a host 20.

[Memory System 10]

Here, a solid-state drive (SSD) is taken as an example of the memory system 10. The memory system 10 includes a NAND flash memory (hereinafter referred to as a "NAND memory") 11, and a controller 12.

The NAND memory 11 is a nonvolatile memory which is physically composed of a plurality of chips (for example, four chips), although illustration is omitted here. Each NAND memory 11 is composed of a plurality of physical blocks (block 0 to block n) each including a plurality of memory cells which are arranged at intersections between word lines and bit lines. In the NAND memory 11, data is erased batch-wise in units of this physical block. In short, the physical block is an erase unit. Writing and reading are executed in units of a page (word line) in each block.

The controller (memory controller, SSD controller) 12 controls the entire operations of the SSD 10. For example, in accordance with a request (instruction, command COM, extension command eCOM, etc.) from the host 20, the controller 12 controls access to the NAND memory 11 (write, read, erase) and a background process BG which is involved in a preceding process. The controller 12 includes a process scheduler 121, a background processor 122, a requested write size 123, a size of a free area 124, and a data access controller 125.

The process scheduler 121 transmits a control signal IS to the background processor 122 so as to execute a predetermined background process, based on an extended command eCOM (second request) which is issued from the host 20, and schedules the background process. In addition, based on the received extended command eCOM, the process scheduler 121 returns an extended status signal ReS, which indicates the state of the self (SSD) 10, to the host 20.

The background processor 122 executes the preceding background process BG for the NAND memory 11.

Here, the background process BG refers to a process which aims at maintaining the performance of the SSD 10, and is other than a process (write, etc.) responding to a request (first request) from the host 20. Examples of the background process BG include garbage collection, block erase, and patrol read. As the background process BG, garbage collection is described here by way of example. The garbage collection (hereinafter, also referred to as "compaction" in some cases) means to generate free blocks by freeing the area occupied with invalid data among the memory areas in the NAND memory 11, and to increase a size of a free area in the NAND memory 11. The "patrol read" means to periodically read out data from the NAND memory 11, in order to detect an accumulation of errors mainly due to data retention, before an error correction becomes impossible. It should be noted that the background process BG is not limited to these processes, and may include a refresh process, for instance. The "refresh process" means that data is read from a block in which errors have accumulated, subjected to the error correction, and then written as corrected data to the block.

The requested write size 123 is a size of write requested from the host 20.

The size of the free area 124 is a size of the free blocks generated in the NAND memory 11, which is calculated by multiplying the number of free blocks by the block size, the free blocks being generated by garbage collection which is the background process BG to be described later.

The data access controller 125 controls data access (write, etc.) to the NAND memory 11, in accordance with a request (first request: write command COM, etc.) from the host 20, after the above-described background process BG was executed in precedence.

[Host 20]

The host (host apparatus, information process apparatus) 20 drives the SSD 10 and requests write, read and erase of user data from the memory system 10. In this case, the host 20 includes, as software components, an operating system 21, a device driver 22, and an application 24. The "erase" refers to an UNMAP(TRIM) and a FORMAT command to erase data in SSD 10, that erases the data which is no longer necessary for the host 20.

The operating system (OS, controller) 21 controls the device driver 22 and application 24, and controls the entire operations of the host 20.

The device driver 22 controls an SSD controller 23, based on the control of the operating system 21 or application 24. The SSD controller 23 executes predetermined access to the controller 12 in accordance with the control of the device driver 22.

The application 24 is software which is executed in accordance with the purpose of a specific work, based on the control of the operating system 21.

In the above configuration, the SSD controller 23 of the host 20 consciously (intentionally) issues to the SSD 10 an extended command eCOM (second request) which is a different definition from the write and read command COM (first request). Here, the second request is not limited to a command form (eCOM), and it should suffice if the second request is some other predetermined extended signal (information, instruction, etc.).

In addition, the controller 12 returns an extended status signal ReS to the host 20 as a response to the above-described received extended command eCOM. In this case, too, the extended status signal is not limited to a status signal form (ReS), and it should suffice if the extended status signal is some other predetermined extended signal (information, return signal, response, etc.).

Accordingly, the host 20 can detect at least the state of the NAND memory 11, based on the returned extended status signal ReS. As a result, the host 20 can instruct a background process (for example, garbage collection, etc.) in accordance with the detected state of the NAND memory 11, etc. The details will be described later.

It should be noted that the order of transmission of the above-described extended command eCOM and extended status signal ReS is not particularly limited. Specifically, an extended predetermined signal may first be transmitted from the SSD 10 to the host 20, and then an extended predetermined signal may be transmitted from the host apparatus 20 to the SSD 10.

[1-2. Command Frame (Write Prenotification Command)]

Next, referring to FIG. 2, a description is given of a command frame of the extended command eCOM according to the first embodiment. Here, a write prenotification command eCOM is taken as an example of the extended command.

As illustrated in FIG. 2, the write prenotification command eCOM is composed of a write size and a write schedule time as its command frame. For example, in the write prenotification command eCOM according to the first embodiment, the write size is 10 GB, and the write schedule time is 60 seconds later from the present time that is issued time of the command eCOM.

It should be noted that the command frame of the write prenotification command eCOM is not limited to that illustrated in FIG. 2. For example, the write prenotification command eCOM may include, as well as the write prenotification time, hint information which can specify a write start time.

2. Background Process and Write Operation

Next, in the above-described configuration, a background process and a write operation are described.

[2-1. Operation on Host 20 Side]

To begin with, referring to FIG. 3 and FIG. 4, the operation on the host 20 side is described.

As illustrated in FIG. 3, in step S11, the SSD controller 23 on the host 20 side recognizes a write prenotification, based on an instruction from the device driver 22.

In step S12, the SSD controller 23 issues a write prenotification command eCOM, which is an extended command, to the SSD 10.

In the meantime, based on the received write prenotification command eCOM, the controller 12 returns to the host apparatus 20 an extended status signal ReS which indicates the state of the free blocks in the NAND memory 11. The details will be described with reference to FIG. 5.

Subsequently, based on the returned status signal ReS, the host 20 detects the size of the free area 124 in the NAND memory 11. Accordingly, as illustrated in FIG. 4, in step S21, the SSD controller 23 issues a write command COM to the SSD 10, based on the status signal ReS.

[2-2. Operation on SSD 10 Side]

Figure 7:
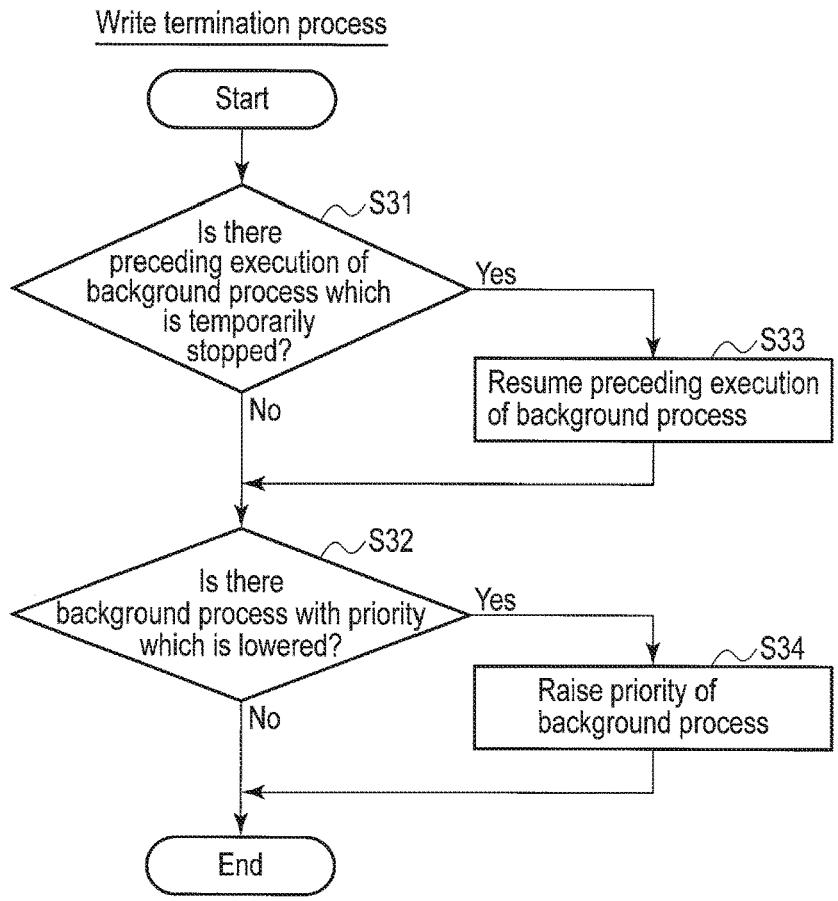
FIG. 7 is a flowchart illustrating a write termination process according to the first embodiment.

Next, referring to FIG. 5 to FIG. 7, the operation on the SSD 10 side is described.

[2-2-1. Free Block Generation (Preceding Background Process)]

To start with, the controller 12 on the SSD 10 side executes an operation illustrated in FIG. 5.

In step S13 of FIG. 5, upon receiving the write prenotification command eCOM, the process scheduler 121 of the controller 12 transmits a control signal IS to the background processor 122, so as to execute garbage collection. The background processor 122, which received the control signal IS, determines whether the requested write size (the write size: 10 GB) 123 described in the received prenotification command eCOM is more than the limit value of the size of the free area 124 in the NAND memory 11. The "limit value" is a predetermined value used to limit the total size of the free area 124 including the free area generated by the instruction from the host 20 in this embodiment. To be more specific, the process scheduler 121 compares the write size 10 GB of the write prenotification command eCOM and the limit value of the size of the free area 124 in the NAND memory 11. Then, the background processor 122 determines whether the write size 10 GB is more than the limit value of the size of the free area 124 in the NAND memory 11, and returns a determination result to the process scheduler 121.

In step S14, based on the above determination result, if the requested write size 123 exceeds the limit value of the size of the free area 124 in the NAND memory 11 (No in S13), the process scheduler 121 controls the background processor 122 so as to change the requested write size 123 to the limit value of the size of the free area 124.

In step S15, based on the above determination result, if the requested write size 123 is less than or equal to the limit value of the size of the free area 124 in the NAND memory 11 (Yes in S13), the process scheduler 121 calculates a generation size in the free area 124 in the NAND memory 11. Specifically, the controller 12 calculates the generation size by subtracting the present size of the free area 124 from the requested write size 123. Here, the "free area" in the NAND memory 11 refers to an area, in which write can be executed to the NAND memory 11, without garbage collection (compaction) being carried out.

In step S16, the process scheduler 121 determines whether a time, which is calculated by subtracting the time necessary for compaction (CMP) from the write time specified in the write prenotification command eCOM, is a present time or later (the time interval is positive or not). Specifically, the process scheduler 121 determines whether a time, which is calculated by subtracting the time necessary for CMP from the write schedule time "60 seconds later" of the write prenotification command eCOM, is a present time or later.

Here, the time necessary for compaction (CMP) can be calculated by adding the time required for compaction of a number of source blocks to generate a number of free blocks corresponding to the generation size. The compaction time of each block can be calculated from the valid cluster ratio (valid cluster counter) of the block. The "valid/invalid clusters" are clusters written in blocks in the NAND memory 11, and those which referred to by LUT are valid clusters, whereas those not referred to by LUT are invalid clusters. It should be noted that the block (compaction source block), which is a target of compaction, is selected from the blocks with the least valid cluster ratios.

An algorithm to obtain the time necessary for compaction will be explained with reference to FIG. 5A.

Here, it can be approximated that a plurality of source blocks are equal to each other in valid cluster ratio (valid cluster ratio) R, in the following conditions. More specifically, first, the number of source blocks required is sufficiently less as compared to the number of blocks corresponding to the physical capacity or the overprovisioning capacity. Further, there is a correlation between (the size of) the number of source blocks and the size of the write request from the host.

FIG. 5A illustrates the case where valid data contained in three source blocks each having a valid cluster ratio R of 1/3 is written in one destination block. Thus, three free blocks are generated, and one free block is consumed. As a result, two free blocks can be obtained. In other words, when the valid cluster ratio R of a source block is 1/3, two free blocks can be obtained while writing in one destination block.

The example of FIG. 5A will be generalized. One free block is obtained by executing compaction of the valid data included in $1/(1-R)$ source blocks, having the valid cluster ratio R, to $R/(1-R)$ destination blocks. By repeating the above process for f times, f free blocks are obtained. In other words, the compaction write size is proportional to $f*(R/(1-R))$ while obtaining free blocks. Here, f is the number of free blocks required to be additionally generated, which is calculated by dividing the generation size by the block size. R is the valid cluster ratio of the source block at the present time.

Here, the time required for one block compaction write is defined as a coefficient α. The time necessary for compaction to obtain f free blocks is proportional to the compaction write size. As a result, the time necessary for compaction can be obtained using the coefficient α in the following equation (I).

$$f*(R/(1-R))*\alpha \quad (I)$$

In step S17, in the case of "True" in step S16, the process scheduler 121 sets this time in a timer (not shown) for the next start.

In step S18, in the case of "False" in step S16, the process scheduler 121 determines whether the requested write size 123 is less than or equal to the size of the free area 124 in the NAND memory 11 which was set in step S15. The reason for this is that, with an elapsed time from step S15 to S18, the size of the free area 124 in the NAND memory 11 may fail to satisfy the requested write size of the host 20. To be more specific, there is a case where the memory system 10 receives an extra write request, from the host or another host, other than the write request prenotified with the eCOM. In this case, a part of the generated free area 124 may be consumed with the extra write request, resulting in a decrease of the size of the free area 124. For example, there may be a case that plural hosts 20 exist.

Specifically, in step S18, the background processor 122, which received an instruction of the process scheduler 121, determines whether the requested write size 123 is less than or equal to the size of the free area 124.

In step S19, if the requested write size 123 is less than the size of the free area 124 (No in S18), the process scheduler 121 controls NAND memory 11 to perform compaction for one block of the NAND memory 11. Specifically, if the condition in step S18 is not satisfied (No in S18), the background processor 122, which received the control signal IS from the process scheduler 121, further executes, prior to write, garbage collection (compaction) as the background process BG for one block of the NAND memory 11. Subsequently, the scheduler 121 repeats this step S19 until satisfying the condition of step S18.

At last, if the requested write size 123 is less than or equal to the size of the free area 124 in the NAND memory 11, which was set in step S15 (Yes in S18), the process scheduler 121 returns to the host 20 an extended status signal ReS.

[2-2-2. Write Operation]

Here, the host 20 issues the write command COM illustrated in FIG. 4 to the controller 12 of the SSD 10, based on the extended status signal ReS which was returned from the SSD 10.

Next, the controller 12, which received the write command COM, executes a write operation illustrated in FIG. 6.

In step S22, the data access controller 125 of the controller 12 determines whether there is a background process BG which is executed precedent to this write.

In step S23, if there is a background process BG which is executed precedent to the write (Yes in S22), the data access controller 125 temporarily stops the preceding background process BG.

In step S24, if there is no background process BG which has higher priority than the write (No in S22), the data access controller 125 determines whether there is a background process BG with a priority which can be lowered.

In step S25, if there is a background process BG with a priority which can be lowered (Yes in S24), the data access controller 125 lowers the priority of the other background process (for example, other garbage collection, block erase, etc.).

In step S26, if there is no background process BG with a priority which can be lowered (No in S24), the data access controller 125 writes write data into the NAND memory 11 at address, based on the write command COM.

[2-2-3. Write Termination Process]

Here, based on the write command COM, the data access controller 125 writes write data into the NAND memory 11 at addresses, and then executes a write termination process illustrated in FIG. 7.

In step S31, the data access controller 125 determines whether there is a background process which is temporarily stopped in the preceding execution background processes BG.

In step S33, if there is a temporarily stopped background process in the preceding execution background processes BG (Yes in S31), the data access controller 125 resumes the preceding execution of this background process.

In step S32, if there is no temporarily stopped background process in the preceding execution background processes BG (No in S31), the data access controller 125 determines whether there is a background process BG with a lowered priority. If there is no background process BG with a lowered priority (No in S32), the data access controller 125 terminates this operation.

In step S34, if there is a background process BG with a lowered priority (Yes in S32), the data access controller 125 raises the priority of this background process BG and terminates this operation.

3. Advantageous Effects

As has been described above, according to the configuration and operation of the information processing system 1 of the first embodiment, at least the following advantageous effects of (1) to (5) can be obtained. The description below is given by comparing, where necessary, the cases of comparative examples 1 and 2 and the case of the first embodiment.

(1) The write performance can be enhanced, and latency can be reduced.

A) Case of Comparative Example 1

Here, comparative example 1 is a memory system in which, unlike the first embodiment, the background process (garbage collection) is not executed in precedence.

Figure 8:
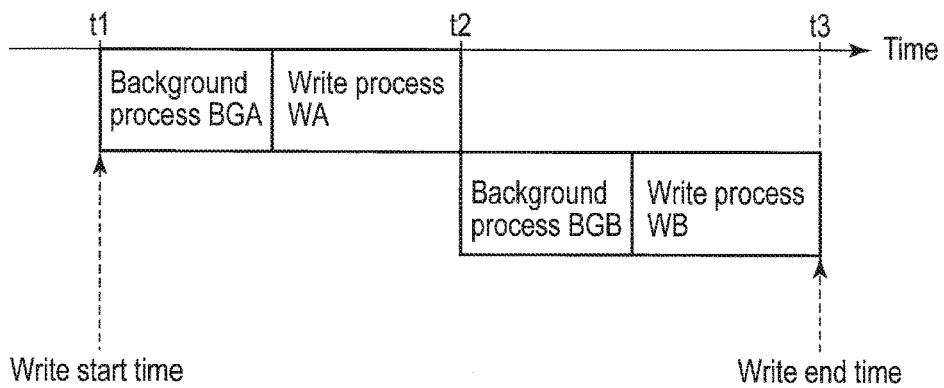
FIG. 8 is a timing chart illustrating a background process and a write process according to comparative example 1.

Thus, as illustrated in FIG. 8, in the memory system according to comparative example 1, a background process (garbage collection) BGA and BGB for securing a free block needs to be executed concurrently with the write process WA and WB. For example, as illustrated in FIG. 8, in the comparative example 1, at time t1, the background process BGA and write process WA are started. Subsequently, at time t2, after the end of the write process WA, the background process BGB and write process WB are started. Thus, at time t3, all write operations are completed.

In this manner, in comparative example 1, in the write process WA and WB, the background process BGA and BGB needs to be also executed concurrently. Thus, in comparative example 1, all of the performance of write to the NAND memory cannot be allocated to the write process. As a result, comparative example 1 is disadvantageous in that the write performance decreases and the latency increases.

B) Case of the First Embodiment

Compared to the above-described comparative example 1, in the first embodiment, the scheduler 121 controls the background processor 122 by the control signal IS so as to execute a predetermined background process, based on the extended command eCOM (second request) which is issued from the host 20. Hence, based on the control signal IS, the background processor 122 executes the background process BG for the NAND memory 11 preceding the access (write, etc.) (FIG. 5, etc.).

Figure 9:
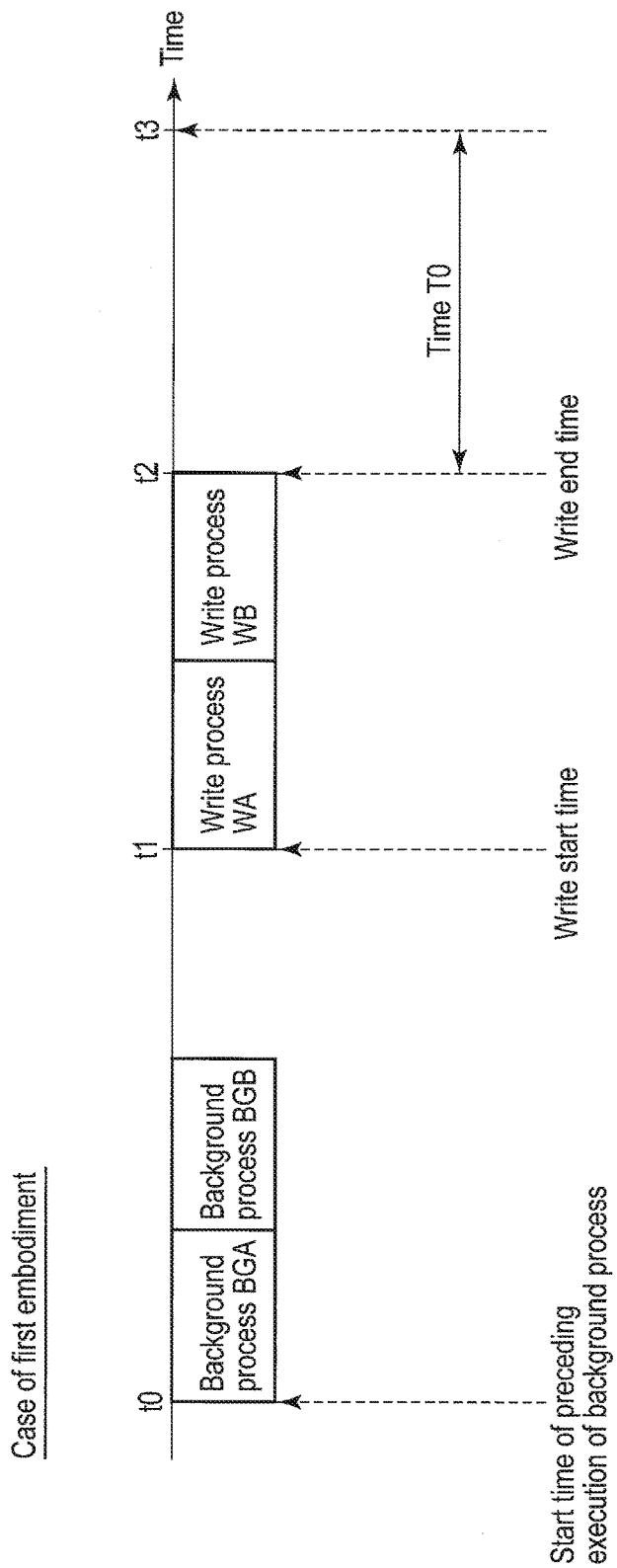
FIG. 9 is a timing chart illustrating a background process and a write process according to the first embodiment.

For example, as illustrated in FIG. 9, in the first embodiment, at time t0, the background processor 122 starts the background process (garbage collection) BGA and BGB, prior to write.

Thus, at time t1, in the state in which the background processes BGA and BGB have all been completed, the write process WA and WB can be started.

As a result, at time t2, the write process WA and WB can be completed.

In this manner, in the first embodiment, since all the performance of write to the NAND memory 11 can be allocated to the write process WA and WB, the write performance can be enhanced. Furthermore, in a typical case, the latency can advantageously be reduced by time T0, compared to comparative example 1.

(2) The ratio of write can be improved.

As illustrated in part (a) of FIG. 10, the ratio between write and compaction (garbage collection) according to comparative example 1 is, for example, about 1:1.

By contrast, in the information processing system 1 according to the first embodiment, by the execution of preceding garbage collection (for example, S19 in FIG. 5) by the host instruction eCOM, it is possible to generate an allowance in the size of a free area for a subsequent write. By the allowance in size of the free block, the ratio of compaction write can greatly be decreased, compared to the ratio of write, and, ideally, the ratio of compaction write can be reduced to substantially zero. Thus, as illustrated in part (b) of FIG. 10, in the first embodiment, the ratio between write and compaction (garbage collection) can be set at about 1:0. In this manner, in the first embodiment, the ratio of write can be improved.

(3) Write-amplification factor (WAF) can be decreased.

Figures 11A, 11B, 11C:
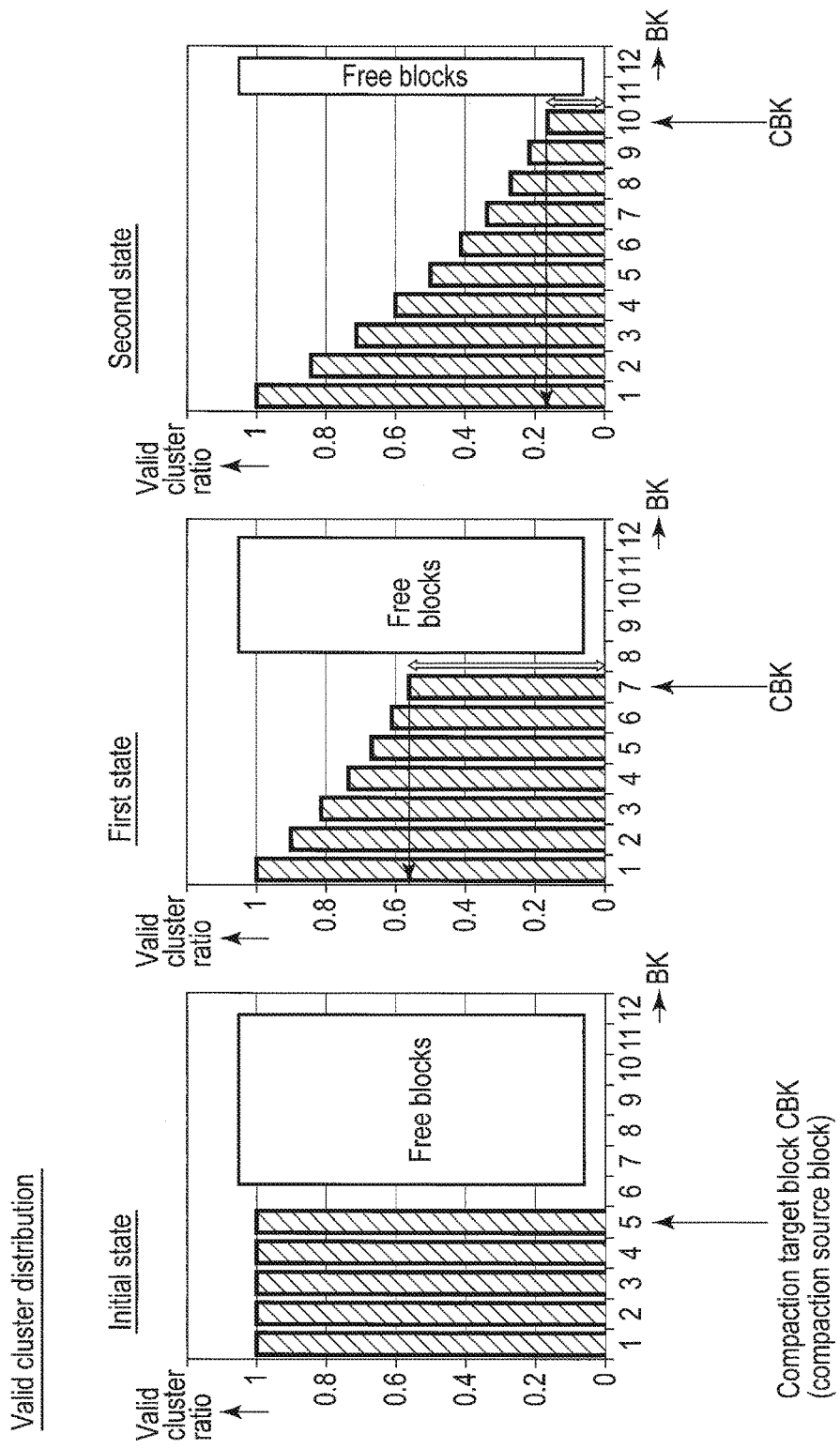
FIG. 11A is a view illustrating a relationship between a block in an initial state and a valid cluster ratio.
FIG. 11B is a view illustrating a relationship between a block in a first state and a valid cluster ratio.
FIG. 11C is a view illustrating a relationship between a block in a second state and a valid cluster ratio.

This advantage will be described by comparing comparative example 2 and the first embodiment with reference to FIG. 11A to FIG. 11C. FIG. 11A to FIG. 11C are views illustrating the relationship between blocks BK and valid cluster ratios, FIG. 11A to FIG. 11C showing valid cluster distributions over physical blocks in an initial state, a first state and a second state, respectively. It should be noted that, in FIG. 11A to FIG. 11C, the size of the hatched areas which correspond to the user capacity of the SSD 10 are equal to each other.

Here, garbage collection is executed for a target of a block (compaction source block) CBK having a least valid cluster ratio. For example, in the initial state of FIG. 11A, since the valid cluster ratio is substantially equally 100%, compaction is executed for the 5th block as a target. On the other hand, in the first and second states of FIG. 11B and FIG. 11C, compaction is executed for the 7th block and the 10th block as targets.

A) Case of Comparative Example 2

Here, comparative example 2 is a memory system which is a drive side and greedily executes preceding compaction. Thus, as indicated in the following two points (a1 and a2), the memory system according to comparative example 2 needs to execute a large amount of garbage collection (compaction).

Point a1) Compaction has to be executed for a compaction source block with a higher valid cluster ratio.

In the case of comparative example 2, in an extreme case, if there is an allowance in time, the memory system maximizes the number of free blocks, and tries to maintain the peak performance as much as possible at the next write request. This corresponds to the case in which the memory system tries to maintain the initial state of FIG. 11A if there is an allowance in time. Specifically, in comparative example 2, in the initial state of FIG. 11A, the amount of compaction, which is necessary for creating one free block, is large.

Point a2) A large amount of compaction has to be executed until reaching the initial state of FIG. 11A from the second state of FIG. 11C.

Here, after a write request from the host continued, a transition has occurred to the second state of FIG. 11C. Thus, in comparative example 2, whenever the time allows, compaction is frequently executed so that a transition may occur from the second state of FIG. 11C to the initial state of FIG. 11A. To put it simply, in order to generate many free blocks, it is necessary to execute a large amount of compaction.

In this manner, in comparative example 2, as a result of the above two points, since a large amount of compaction needs to be executed as a whole, WAF is larger.

It should be noted that, in the case of comparative example 1, a garbage collection process is not preceding execution. Thus, in the second state of FIG. 11C, compaction is constantly executed. Accordingly, the valid cluster ratio of the compaction source drops to as low as about 20%, and hence WAF is low. However, in the case of comparative example 1, since the number of free blocks is always small, comparative example 1 is disadvantageous in that the ratio of write is low, and the peak performance is low.

B) Case of the First Embodiment

By contrast, in the first embodiment, based on the instruction (eCOM) of the host 20 which is the device driver side, the garbage collection process is precedently executed. According to this, the memory system 10 generates the size of the free area 124 when needed in accordance with the required write size.

As a result, an inefficient, useless compaction, as in comparative example 2, can be avoided. In addition, unlike comparative example 1, the ratio of write does not decrease, and the peak performance can be improved.

(4) The peak power consumption can be reduced.

As described above, in the first embodiment, prior to write, the garbage collection process BG is precedently executed. In other words, the write and garbage collection process BG can be executed in a temporally distributed manner. Thus, the first embodiment is advantageous in that, since these two operations are processed in a temporally distributed manner, the power consumption involved in the process can be distributed, and the peak power consumption can be reduced.

(5) As regards the other background process such as block erase, the same advantageous effects as in the above (1) to (4) can be obtained.

As illustrated in FIG. 12, if the advantageous effects of the above-described comparative examples 1 and 2 and first embodiment are summarized, the method of maximization of peak performance is, in comparative example 2, greedy garbage collection at the discretion of the SSD (drive) itself. On the other hand, the first embodiment is different with respect to the preceding garbage collection on the instruction (eCOM) of the host 20.

Thus, the peak performance is high in each of the comparative example 2 and the first embodiment. However, while the preceding compaction amount is excessively large in comparative example 2, the amount that is a total amount of the generated free blocks necessary for the peak performance based on the host instruction (eCOM) can be obtained in the first embodiment. In addition, as described in the above (3), the WAF in comparative example 2 is larger than that in the first embodiment.

The advantageous effects as described above are not limited to the garbage collection (compaction). Specifically, needless to say, the same advantageous effects as in the above (1) to (4) can be obtained with respect to the other background processes such as block erase and patrol read.

Second Embodiment

[the Host Explicitly Requests Switching On/Off of the Preceding Background Process]

Next, referring to FIG. 13 to FIG. 18, an information processing system according to a second embodiment is described. The second embodiment relates to an example in which the host 20 requests, from the SSD 10A, switching On/Off of the preceding background process. In the description below, a detailed description of the configurations and operations, which overlap those of the first embodiment, is omitted.

[Information Processing System]

Referring to FIG. 13, a configuration of an information processing system 1A according to the second embodiment is described. As illustrated in FIG. 13, the second embodiment differs from the first embodiment in that the information processing system 1A according to the second embodiment does not include the process scheduler 121, and the extended command eCOM1, eCOM2 is transmitted from the host 20 to the background processor 122.

The host 20 transmits the extended command eCOM1 to the background processor 122, thereby controlling On (execution) or Off (non-execution) of preceding execution of the background process. Further, the host 20 transmits the extended command eCOM2 to the background processor 122, thereby requesting inquiry of the free-area size in the NAND memory 11, and checking the status of the free area.

The background processor 122, which received the extended command eCOM1, eCOM2, returns to the host 20 an extended status signal ReS based on this extended command. For example, the background processor 122, which received the extended command eCOM2, notifies the host 20 of the size of the free area in the NAND memory 11 as the content of the extended status signal ReS based on the command eCOM2. The details of these will be described later.

[Command Frame (eCOM1, eCOM2, ReS)]

Referring to FIG. 14, a description is given of command frames of the extended commands and status signal according to the second embodiment.

As illustrated in FIG. 14A, the extended command eCOM1 according to the second embodiment is composed of a control flag of On/Off of preceding execution, and a requested write size. For example, when the preceding execution of the background process is requested to be On, the control flag of the extended command eCOM1 is set.

And when the preceding execution of the background process is requested to be Off, the control flag of the extended command eCOM1 is set in a "0" state.

As illustrated in FIG. 14B, a parameter is not particularly set for the extended command eCOM2 according to the second embodiment. The extended command eCOM2 is composed such that the extended command eCOM2 has a different definition from other write command COM, etc., to inquire the size of the free area in the NAND memory 11. The "free area" in the NAND memory 11 refers to an area, which enables writing to the NAND memory 11 without executing garbage collection (compaction).

As illustrated in FIG. 14C, the extended status signal ReS according to the second embodiment is composed of a size of the free area, which is calculated from the number of free blocks, as a return signal of the extended command eCOM2. For example, the content of the size of the free area of the extended status signal ReS according to the second embodiment is described as 5 GB.

[Background Process and Write Operation]

Next, a background process and a write operation in the above-described configuration are described. In the description below, the background process and write operation are described as a series of operations on the host 20 side and SSD 10A side.

[Operation of Preceding Execution on of the Background Process]

Figure 15A:
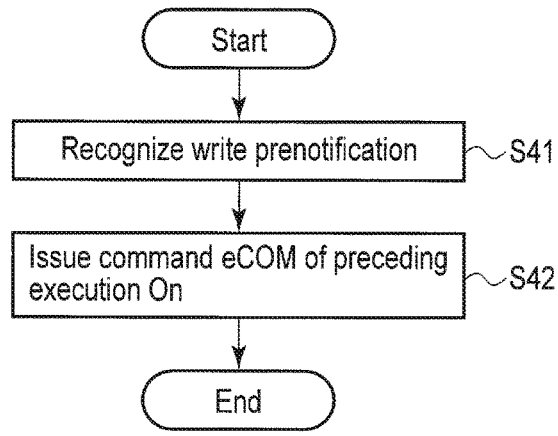
FIG. 15A is a flowchart illustrating an instruction of preceding execution On of a background process according to the second embodiment.

As illustrated in FIG. 15A, in step S41, the SSD controller 23 of the host 20 recognizes write prenotification based on an instruction of the device driver 22.

In step S41, the SSD controller 23 issues an extended command eCOM1 of preceding execution On to the background processor 122. To be more specific, the SSD controller 23 issues an extended command eCOM1 with the control flag of the "1" state to the background processor 122, so as to execute preceding execution of the background process.

Figure 15B:
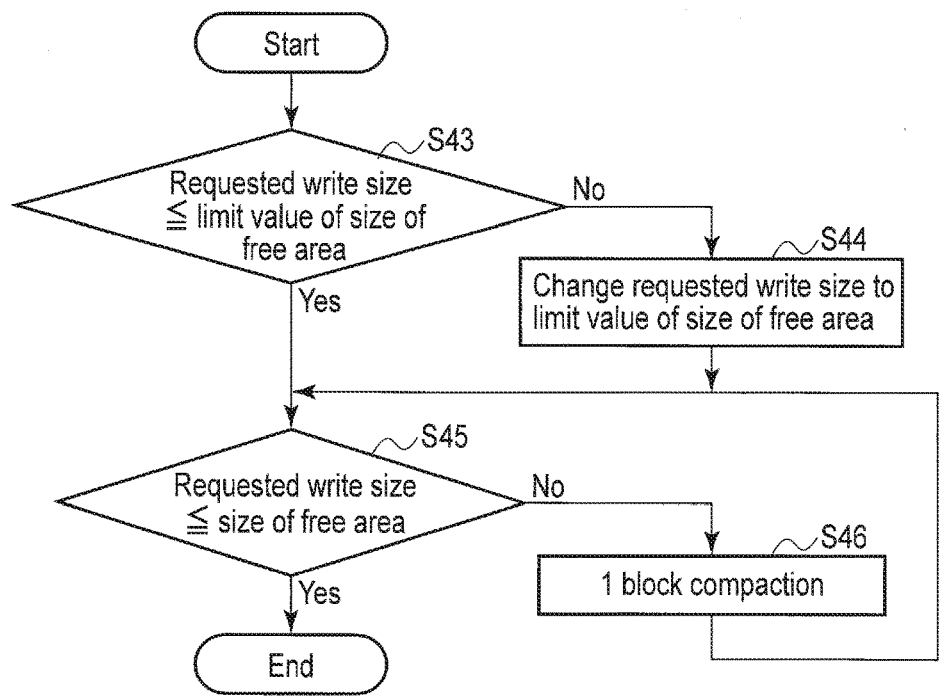
FIG. 15B is a flowchart illustrating free block generation according to the second embodiment.

Subsequently, as illustrated in FIG. 15B, the background processor 122, which received the extended command eCOM1, first starts the preceding execution of the background process, since the control flag of the command eCOM1 is in the "1" state.

Next, in step S43, the background processor 122 determines whether the requested write size described in the received command eCOM1 is less than or equal to the limit value of the size of the free area 124 in the NAND memory 11. To be more specific, the background processor 122 compares the write size 10 GB of the command eCOM1 and the limit value of the size of the free area 124 in the NAND memory 11. Then, the background processor 122 determines whether the write size 10 GB is less than or equal to the limit value of the size of the free area 124 in the NAND memory 11.

In step S44, if the requested write size 123 is greater than the limit value of the size of the free area 124 in the NAND memory 11 (No in S43), the background processor 122 changes the requested write size to the limit value of the size of the free area 124.

In step S45, if the requested write size is less than or equal to the limit value of the size of the free area 124 in the NAND memory 11 (Yes in S43), the background processor 122 determines whether the requested write size of the command eCOM1 is less than or equal to the size of the free area 124 in the NAND memory 11 which was set in step S43. This is because with an elapsed time, the size of the free area in the NAND memory 11 may fail to satisfy the requested write size of the host 20. To be more specific, there is a case where the memory system 10A receives an extra write request, from the host or another host, other than the write request pre-notified with the eCOM. In this case, a part of the generated free blocks may be consumed with the extra write request, resulting in a decrease of the number of free blocks.

In step S46, if the requested write size is larger than the size of the free area 124 (No in S45), the background processor 122 controls to perform compaction of one block of the NAND memory 11. Specifically, in this case, the background processor 122 executes, prior to write, garbage collection (compaction) in advance as the background process BG for one block of the NAND memory 11. Subsequently, the background processor 122 repeats this step S46 until satisfying the condition of step S45.

At last, if the condition of step S45 is satisfied (Yes in S45), the background processor 122 returns to the host 20 an extended status signal ReS which is indicative of the size of the free area (for example, 5 GB) which is calculated from the number of free blocks.

[Operation of Preceding Execution Off of the Background Process]

Figure 16A:
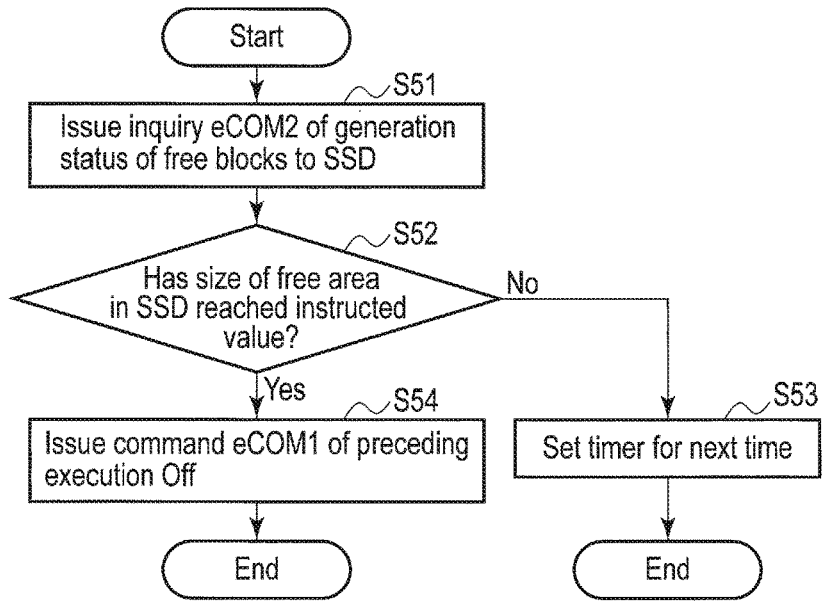
FIG. 16A is a flowchart illustrating an instruction of preceding execution Off of the background process according to the second embodiment.

As illustrated in FIG. 16A, in step S51, based on an instruction of the device driver 22, the SSD controller 23 of the host 20 issues an extended command eCOM2 to the background processor 122 of the SSD 10A, as an inquiry of the generation status of the free blocks in the SSD 10A.

In step S52, based on an extended status signal ReS (to be described later in detail with reference to FIG. 16B) which was returned from the background processor 122, the SSD controller 23 determines whether the size of the free area in the SSD 10A (size 5 GB of free area of ReS) has reached an instructed value.

In step S53, if the size of the free area in the SSD 10A has not reached the instructed value (No in S52), the SSD controller 23 sets a timer (not shown) for the next time.

In step S54, if the size of the free area in the SSD 10 has reached the instructed value (Yes in S52), the SSD controller 23 issues a command eCOM1 by which the preceding execution of the background process in the Off state. Specifically, the SSD controller 23 issues to the background processor 122 the extended command eCOM1 with the flag in the "0" state, so as not to carry out the preceding execution of the background process.

Figure 16B:
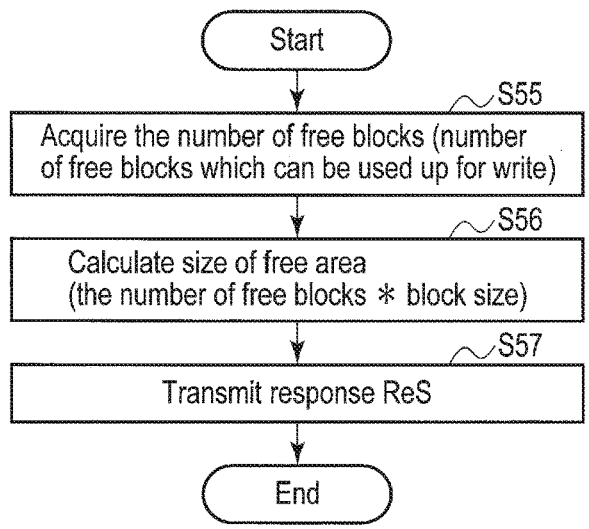
FIG. 16B is a flowchart illustrating a response to inquiry of generation status of free blocks according to the second embodiment.

As illustrated in step S55 of FIG. 16B, the background processor 122, which received the extended command eCOM2 as the inquiry of the generation status of the free blocks in step S51 of FIG. 16A, acquires the number of free blocks. Specifically, the background processor 122 acquires the number of free blocks which can be used up for write to the NAND memory 11.

In step S56, the background processor 122 calculates the size of the free area. Specifically, the background processor 122 multiplies the number of free blocks, which was acquired in step S55, by the block size, and calculates the size of the free area.

In step S57, the background processor 122 transmits to the host 20 a status signal ReS describing the size (for example, 5 GB) of the free area calculated in step S56.

Figure 16C:
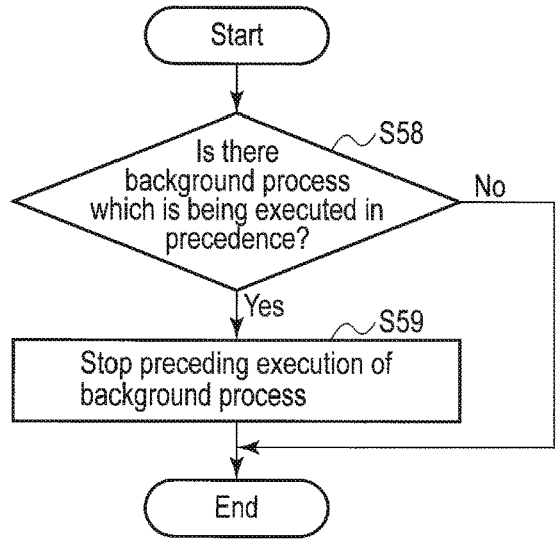
FIG. 16C is a flowchart illustrating turning preceding background process Off according to the second embodiment.

In step S58 of FIG. 16C, the background processor 122, which received the extended command eCOM1 in step S54 of FIG. 16A, determines whether there is a background process BG which is being executed in precedence. If the condition of step S58 is not satisfied (No in S58), the background processor 122 terminates the operation of turning preceding background process Off.

In step S59, if the condition of step S58 is satisfied (Yes in S58), the background processor 122 stops the background process (for example, garbage collection process) BG which is being executed.

[Issuing Write Command]

Figure 17:
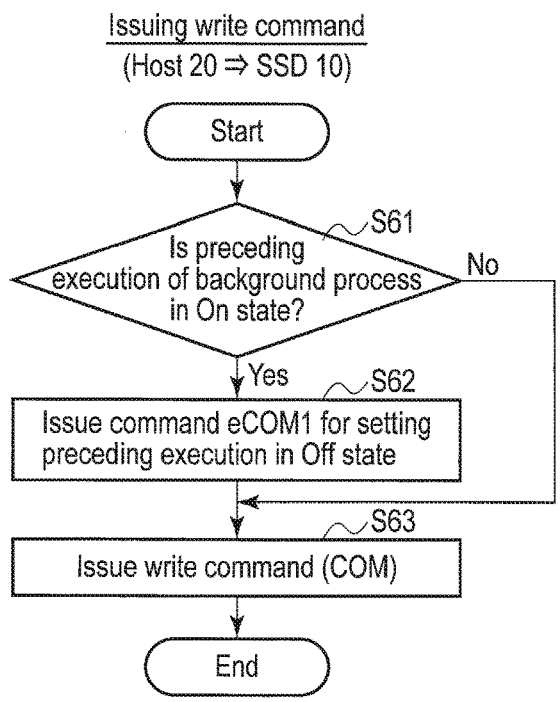
FIG. 17 is a flowchart illustrating issuing write command according to the second embodiment.

As illustrated in FIG. 17, at a time of issuing a write command COM, the SSD controller 23 determines, in step S61, whether the preceding execution of the background process BG is in the On state or not. If this condition of step S61 is not satisfied (No in S61), the process goes to step S63.

In step S62, in order to set the preceding execution of the background process BG into the Off state, the SSD controller 23 issues to the SSD 10A an extended command eCOM1 with the control flag indicating the "0" state.

In step S63, the SSD controller 23 receives a status signal ReS from the background processor 122, and issues a write command COM to the SSD 10A.

The write operation executed by the data access controller 125 after receiving the write command COM are substantially the same as those in the above-described first embodiment. Thus, a detailed description thereof is omitted.

Advantageous Effects

As has been described above, according to the information processing system 1 of the second embodiment, at least the same advantageous effects as the above-described (1) to (5) can be obtained.

Here, in the second embodiment, the host 20 transmits the extended command eCOM1 to the SSD 10A, and requests switching On/Off of the preceding background process (FIG. 14A, FIG. 15A). When switching the preceding execution On was requested, the background processor 122 of the SSD 10A, which received this command eCOM1, executes garbage collection as the background process, prior to the write operation (FIG. 15B). Thereby, the background processor 122 continues to generate free blocks until the size of the free area 124 reaches the requested write size 123 (FIG. 15B). Thus, before the write, the sufficient number of free blocks can be secured. In addition, in the case of executing write, the host 20 sets the preceding execution of the background process of the SSD 10 in the Off state (FIG. 16A to FIG. 16C, FIG. 17).

Furthermore, in the second embodiment, the host 20 issues an inquiry to the SSD 10A by sending the extended command eCOM2, and monitors the generation status of the free blocks in the SSD 10A (S51 to S52 of FIG. 16A, etc.).

Figure 18:
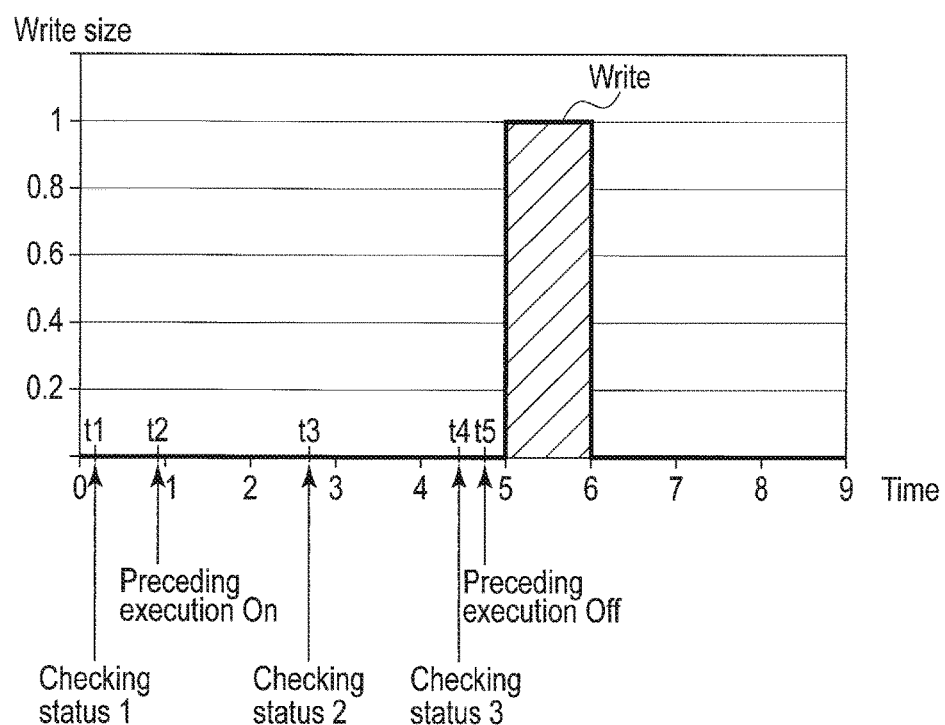
FIG. 18 is a timing chart illustrating a relationship between time and a write size according to the second embodiment.

For example, the above control, which is executed by the information processing system 1A of the second embodiment, is illustrated as shown in FIG. 18.

As illustrated in FIG. 18, at time t1, the host 20 transmits the command eCOM2 to the SSD 10A, and executes check 1 of the generation status of the free blocks in the SSD 10A.

At time t2, based on the check result of the check 1, the host 20 transmits the command eCOM1 to the SSD 10A, and requests On of preceding execution of the garbage collection as the background process.

At time t3 and time t4, the host 20 similarly transmits the command eCOM2 to the SSD 10A, and executes check 2 and check 3 of the generation status of the free blocks in the SSD 10A.

At time t5 immediately before write, the host 20 transmits the command eCOM1 to the SSD 10A, based on the check result of the check 3, and requests Off of preceding execution of the garbage collection as the background process.

In this manner, according to the second embodiment, the selectivity of the information processing system 1A can be broad, without the provision of the process scheduler 121. In addition, where necessary, the second embodiment can be applied.

Modification 1

Figure 19:
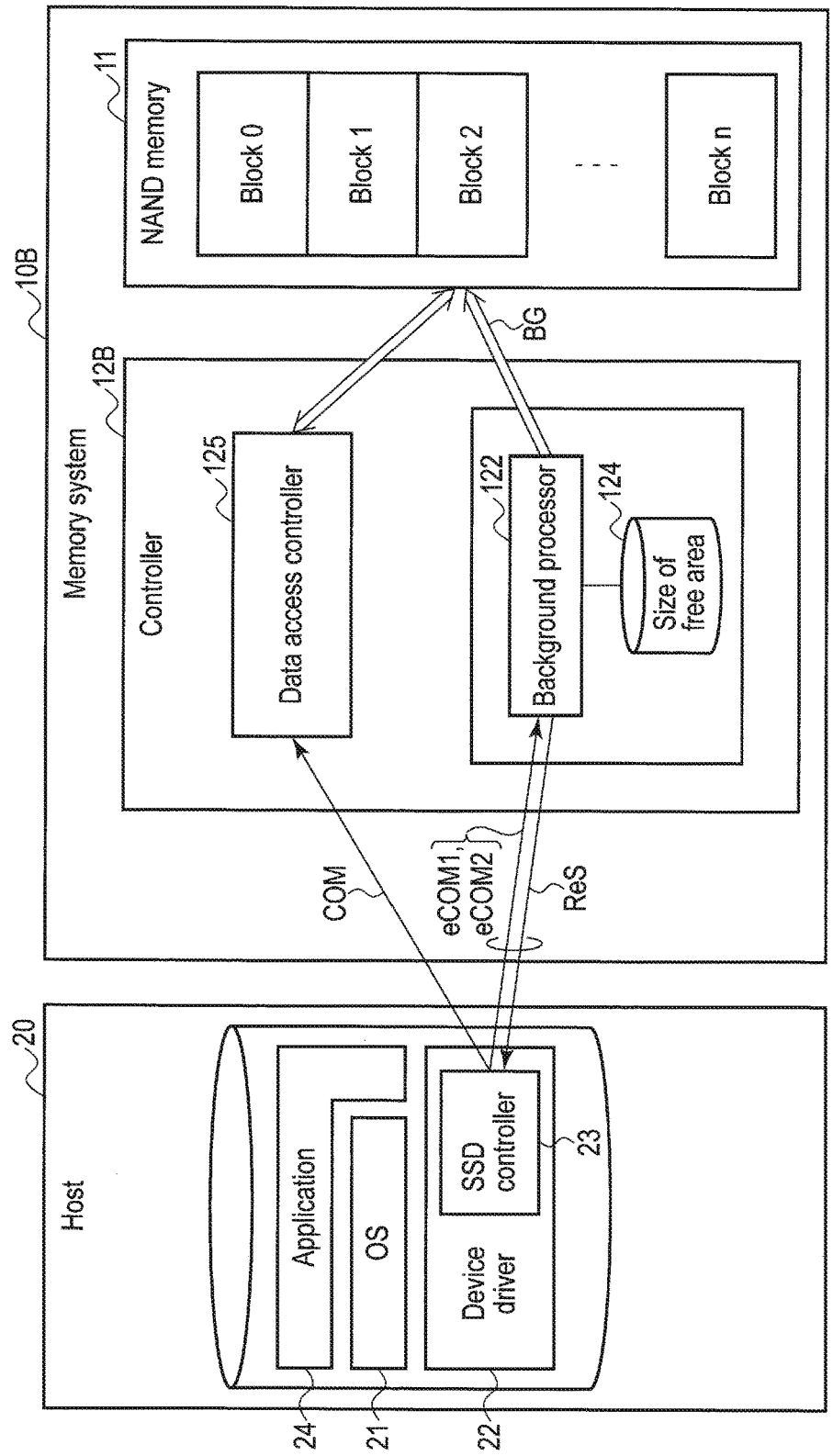
FIG. 19 is a block diagram illustrating a configuration example of an information processing system according to Modification 1.
Figure 20:
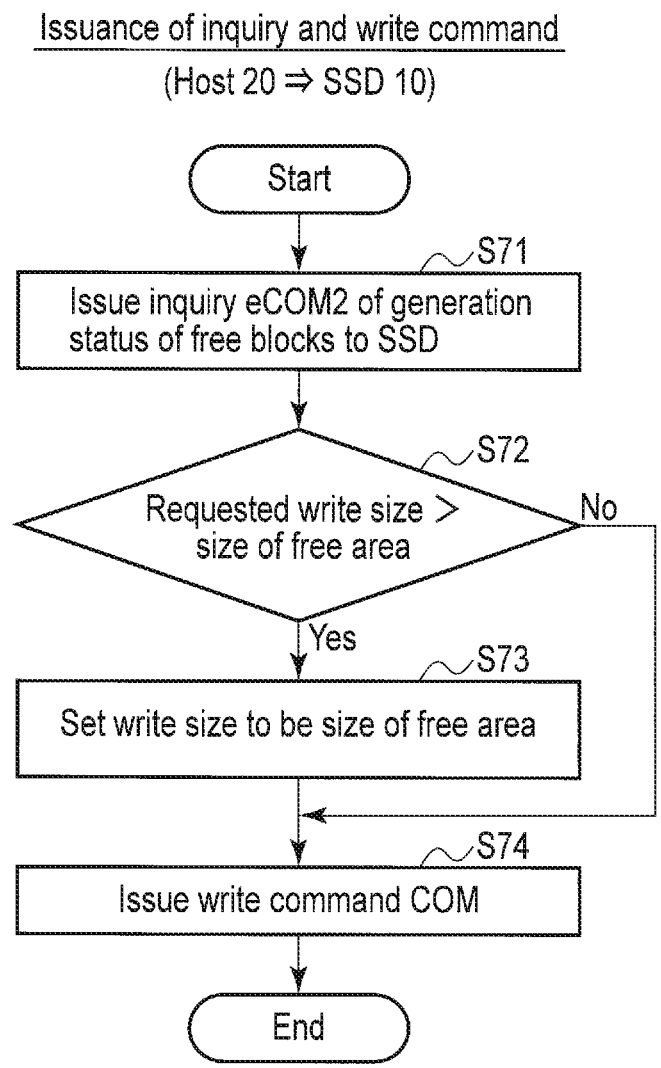
FIG. 20 is a flowchart illustrating the issuance of an inquiry and a write command according to Modification 1.
Figure 21:
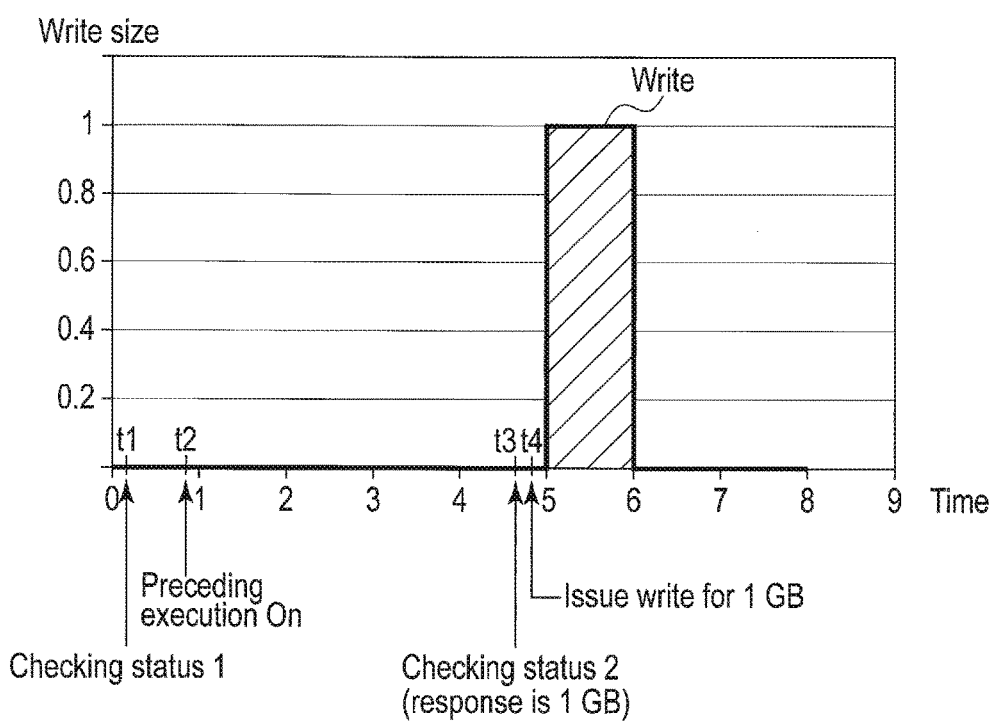
FIG. 21 is a timing chart illustrating a relationship between time and a write size according to Modification 1.

Next, referring to FIG. 19 to FIG. 21, an information processing system according to Modification 1 is described. Modification 1 is an example of a variation of the second embodiment. In the description below, a detailed description of the configurations and operations, which overlap those of the first and second embodiments, is omitted.

[Information Processing System]

Referring to FIG. 19, a configuration of an information processing system 1B according to Modification 1 is described. As illustrated in FIG. 19, Modification 1 differs from the second embodiment in that the information processing system 1B according to Modification 1 does not include the requested write size 123.

Since the other configuration is substantially the same as in the second embodiment, a detailed description thereof is omitted.

[Issuing Inquiry and Write Command]

Referring to FIG. 20, a description is given of issuance operations of an inquiry and a write command of the information processing system 1B according to Modification 1. It is now assumed that the garbage collection as the background process BG is being executed in precedence by the extended command eCOM1 which was transmitted from the host 20.

In step S71, the SSD controller 23 of the host 20 issues an extended command eCOM2 to the background processor 122, and inquires about the generation status of the free blocks generated by the background process BG executed in precedence. The background processor 122, which received the inquiry, returns the size of the free area 124 to the SSD controller 23 by an extended status signal ReS.

In step S72, the SSD controller 23 determines whether the requested write size, which the host 20 requires to execute to the memory system 1, is larger than the size of the free area 124. To be more specific, based on the size of the free area 124 which is described in the returned status signal ReS, the SSD controller 23 determines whether the write size required by the host 20 is larger than the size of the free area 124. If the condition of step S72 is not satisfied (No in S72), the process goes to step S74.

In step S73, if the requested write size, which the host 20 requires to execute to the memory system 1B, is larger than the size of the free area 124 (Yes in S72), the SSD controller 23 makes the write size regulated to the size of the free area 124.

In step S74, based on the set size, the SSD controller 23 issues a write command COM to the data access controller 125. To be more specific, in the case of "No" in S72, the size of the free area 124, which was generated by the background process BG that was executed in precedence, is larger than the write size required by the host 20. Thus, the SSD controller 23 issues the write command COM so as to execute write, based on the set size (the write size). On the other hand, in the case of continuance from S73, the SSD controller 23 issues the write command COM so as that the requested write size is equalized to the size of the free area 124.

Since the preceding execution On/Off of other background processes and write operation are substantially the same as in the first and second embodiments, detailed description thereof is omitted.

[Advantageous Effects]

As has been described above, according to the information processing system 1B of Modification 1, at least the same advantageous effects as the above-described (1) to (5) can be obtained.

Here, according to Modification 1, the host 20 issues the command eCOM2 to the SSD 10B and inquires about the generation status of the free blocks 124 in the SSD 10B (S71 in FIG. 20). Then the host 20 writes the data of the size of the free area, based on the inquiry (S72 to S74 in FIG. 20). In other words, in Modification 1, even in the case where the SSD 10B is executing the background process BG in precedence and the size of the free area 124 fails to meet the requested write size 123, the host 20 executes write for an acceptable write size in accordance with the size of the free area 124 (S73 in FIG. 20). In addition, even in the case where the host 20 has not issued an instruction of preceding execution On of the background process BG, the host 20 can write for up to the acceptable write size in accordance with the size of the free area in the NAND memory 11.

For example, the control, which is executed by the information processing system 1B of Modification 1, is illustrated as shown in FIG. 21.

As illustrated in FIG. 21, at time t1, the host 20 issues the command eCOM2 to the SSD 10B, and executes check 1 of the generation status of the free blocks 124 in the SSD 10B (S71 in FIG. 20).

At time t2, based on the check result of the check 1, the host 20 transmits the command eCOM1 to the SSD 10B, and requests On of preceding execution of the garbage collection as the background process.

At time t3, the host 20 similarly issues the command eCOM2 to the SSD 10B, and executes check 2 of the generation status of the free blocks 124 in the SSD 10B.

At time t4, the host 20 issues the write command COM to the SSD 10B, based on the size 1 GB described in the extended status signal ReS, which is the check result of the check 2, and causes the SSD 10B to execute write of the size 1 GB.

In this manner, according to Modification 1, the selectivity of the information processing system 1 can be broad, without the provision of the process scheduler 121 and the requested write size 123. In addition, where necessary, Modification 1 can be applied.

Third Embodiment

In a third embodiment, a detailed configuration of the information processing system 1, which has been described in the first and second embodiments and Modification 1, is described.

[Detailed Configuration of Information Processing System 1]

FIG. 22 is a block diagram illustrating an example of the detailed configuration of an information processing system 1C according to the third embodiment. In FIG. 22, the process scheduler 121 and background processor 122 according to the above-described first and second embodiments and Modification 1 correspond to, for example, a CPU 43B, etc. In addition, the data access controller 125 according to the above-described first and second embodiments and Modification 1 corresponds to, for example, a host interface 41, etc. The requested write size 123 and the size of the free area 124 may be located in a volatile memory and used.

As illustrated in FIG. 22, the controller 12C includes a front end 12F and a back end 12B.

The front end (host communication unit) 12F includes the host interface 41, a host interface controller 42, an encryption/decryption unit (Advanced Encryption Standard [AES]) 44, and the CPU 43F.

The host interface 41 communicates with the information processing apparatus 20 for communication of requests (write command, read command, erase command (UNMAP (TRIM) command), etc.), logical addresses LBA, and data.

The host controller (controller) 42 controls the communication of the host interface 41, based on the control of the CPU 43F.

The encryption/decryption unit (Advanced Encryption Standard [AES]) 44 encrypts, in a write operation, write data (plain text) which is sent from the host interface controller 42. The encryption/decryption unit 44 decrypts, in a read operation, encrypted read data which is sent from a read buffer RB of the back end 12B. It should be noted that, where necessary, write data and read data can be transmitted without the intervention of the encryption/decryption unit 44.

The CPU 43F controls the respective components 41, 42 and 44 of the front end 12F, and controls the entire operations of the front end 12F.

The back end (memory communication unit) 12B includes a write buffer WB, the read buffer RB, an LUT unit 45, a DDRC 46, a DRAM 47, a DMAC 48, an ECC 49, a randomizer RZ, a NANDC 50, and a CPU 43B.

The write buffer (write data transfer unit) WB temporarily stores write data WD which is transmitted from the host 20. Specifically, the write buffer WB temporarily stores data until the size of the write data WD reaches a predetermined size that is suited to the NAND memory 11.

The read buffer (read data transfer unit) RB temporarily stores read data RD which was read out from the NAND memory 11. Specifically, in the read buffer RB, the read data RD is rearranged in an order suited to the host 20 (an order of logical addresses LBA which is designated by the host 20).

The look-up table (LUT) 45 is a conversion table to convert the logical address LBA to a corresponding physical address PBA.

The DDRC 46 controls a double data rate (DDR) in the DRAM 47.

The dynamic random access memory (DRAM) 47 is, for example, a volatile memory which stores the LUT 45.

The direct memory access controller (DMAC) 48 transfers write data WD and read data RD via an internal bus IB. In FIG. 22, although one DMAC 48 is illustrated, the controller 12 may include two or more DMACs 48. The DMAC 48 is set at various positions in the controller 12, where necessary.

The error correction unit (ECU) 49 adds an error correction code (ECC) to the write data WD which is sent from the write buffer WB. The ECC 49 corrects, where necessary, the read data RD which was read out from the NAND memory 11, by using the added ECC, when the ECC 49 sends the read data RD to the read buffer RB.

The randomizer (or scrambler) RZ is configured to equalize the frequency of being programmed as 1 and that as 0 for each cell (wear leveling for each cell) and to suppress unevenness in the numbers of 1 and 0 within a page (reduction of interference between cells or between pages, and equalization). In this manner, the number of times of write can be leveled, and the life of the NAND memory 11 can be increased. Therefore, the reliability of the NAND memory 11 can be enhanced.

The NAND controller (NANDC) 50 accesses the NAND memory 11 in parallel by using a plurality of channels (in this example, four channels CH0 to CH3), in order to meet a predetermined speed requirement.

The CPU 43B controls the above-described respective structural components (45 to 50, RZ) of the back end 12B, and controls the entire operations of the back end 12B.

It should be noted that the configuration of the controller 12 illustrated in FIG. 22 is merely an example, and is not limited to the illustrated configuration.

[Storage System 100]

Figure 23:
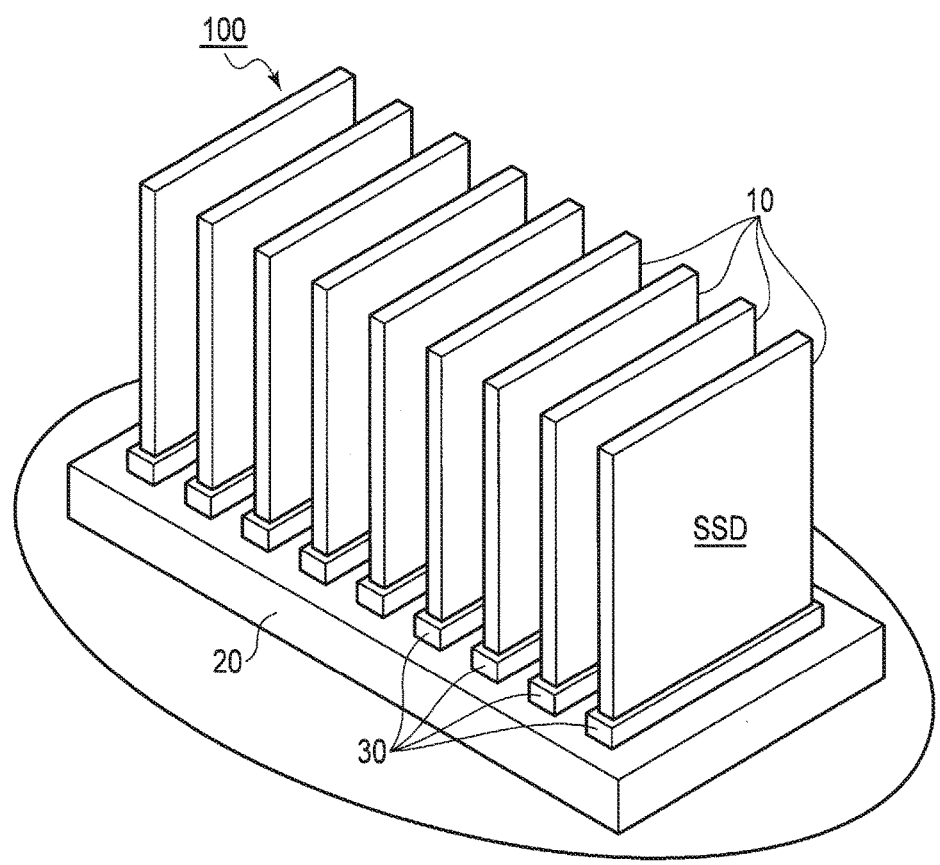
FIG. 23 is a perspective view illustrating a storage system according to the third embodiment.

FIG. 23 is a perspective view illustrating a storage system 100 according to the third embodiment.

The storage system 100 includes a plurality of memory systems 10 as SSDs.

The external appearance of the memory system 10 is, for example, a relatively small module, and the outer-shape dimensions are, for instance, about 120 mm×130 mm. It should be noted that the size and dimensions of the memory system 10 are not limited to these, and proper changes to various sizes are possible.

In addition, the memory system 10 can be used by being mounted in the host 20 that is an information processing apparatus such as a server, in a data center or a cloud computing system which is operated in a company (enterprise). Thus, the memory system 10 may be an Enterprise SSD (eSSD).

The host 20 includes a plurality of connectors (for example, slots) 30 which open upward, for example. Each connector 30 is, for instance, a SAS (Serial Attached SCSI) connector. According to this SAS connector, the host 20 and each memory system 10 can execute high speed communication by 6 Gbps dual ports. It should be noted that each connector 30 is not limited to this, and may be, for instance, a PCI Express (PCIe).

The plural memory systems 10 are attached to the connectors 30 of the host 20, respectively, and are juxtaposed and supported in upright attitudes in a substantially vertical direction. According to this configuration, the plural memory systems 10 can be mounted in a compact size, and the size of the memory system 10 can be reduced. Furthermore, the shape of each memory system 10 of the third embodiment is a 2.5 type SFF (Small Form Factor). By this shape, the memory system 10 can have a compatible shape with an Enterprise HDD (eHDD), and system compatibility with the eHDD can be realized.

The memory system 10 is not limited to the use for enterprises. For example, the memory system 10 is applicable as a storage medium of a consumer electronic device such as a notebook computer or a tablet computer.

As has been described above, according to the information processing system 1 and storage system 100 relating to the third embodiment, the same advantageous effects as in the above-described first and second embodiments and Modification 1 can be obtained in connection with large storage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A memory system comprising:
a nonvolatile memory; and
a controller configured to:
receive commands issued from a host, the commands including a first command and a second command,
control access to the nonvolatile memory based on the received first command, and
execute a background process for the nonvolatile memory based on the received second command issued before the first command is issued,
wherein the first command is a command which requests first data to be written into the nonvolatile memory, and
the second command is a command which requests the background process to be executed and includes information relating to the first data or the first command.

2. The memory system of claim 1, wherein the memory system further includes a scheduler configured to schedule the background process.

3. The memory system of claim 2, wherein the background process is garbage collection for securing, on the nonvolatile memory, a free area for writing data in the nonvolatile memory, and
the scheduler is configured to perform the garbage collection until a free area having a size indicated by the information in the second command is generated in the nonvolatile memory.

4. The memory system of claim 3, wherein the controller is configured to write the first data into the generated free area in the nonvolatile memory based on the received first command.

5. The memory system of claim 1, wherein the information in the second command includes a size of the first data, and a write start time or hint information capable of specifying the write start time.

6. The memory system of claim 1, wherein the information in the second command includes a size of the first data, and flag information of instructing executing or stopping of the background process.

7. The memory system of claim 1, wherein the background process includes at least one of the following: block erase, patrol read, and refresh process.

8. An information processing system comprising:
a memory system including a nonvolatile memory; and
a host configured to send commands including a first command and a second command to the memory system,
wherein the memory system further includes a controller configured to:
receive the commands issued from the host,
control access to the nonvolatile memory based on the received first command, and
execute a background process for the nonvolatile memory based on the received second command issued before the first command is issued,
wherein the first command is a command which requests first data to be written into the nonvolatile memory, and
the second command is a command which requests the background process to be executed and includes information relating to the first data or the first command.

9. The information processing system of claim 8, wherein the memory system further includes a scheduler configured to schedule the background process.

10. The information processing system of claim 9, wherein the background process is garbage collection for securing, on the nonvolatile memory, a free area for writing data in the nonvolatile memory, and
the scheduler is configured to perform the garbage collection until a free area having a size indicated by the information in the second command is generated in the nonvolatile memory.

11. The information processing system of claim 10, wherein the controller is configured to write the first data into the generated free area in the nonvolatile memory based on the received first command.

12. The information processing system of claim 8, wherein the information in the second command includes a size of the first data, and a write start time or hint information capable of specifying the write start time.

13. The information processing system of claim 8, wherein the information in the second command includes a size of the first data, and flag information of instructing executing or stopping of the background process.

14. The information processing system of claim 8, wherein the background process includes at least one of the following: block erase, patrol read, and refresh process.

15. An information processing device comprising:
a memory interface capable of sending commands including a first command and a second command to a memory system that comprises a nonvolatile memory; and
a controller configured to:
send the first command via the memory interface to cause the memory system to control access to the nonvolatile memory based on the sent first command, and
send the second command via the memory interface to cause the memory system to execute a background process in the memory system based on the sent second command,
wherein the first command is a command which requests the memory system to write first data into the nonvolatile memory, and
the second command is a command which requests the memory system to execute the background process and includes information relating to the first data or the first command.

16. The information processing device of claim 15, wherein the memory system further comprises a scheduler configured to schedule the background process.

17. The information processing device of claim 16, wherein the background process is garbage collection for securing, on the nonvolatile memory, a free area for writing data in the nonvolatile memory, and
the scheduler is configured to perform the garbage collection until a free area having a size indicated by the information in the second command is generated in the nonvolatile memory.

18. The information processing device of claim 17, wherein the memory system is configured to write the first data into the generated free area in the nonvolatile memory based on the first command.

19. The information processing device of claim 15, wherein the information in the second command includes a size of the first data, and any one of a write start time, hint information capable of specifying the write start time, and flag information of instructing executing or stopping of the background process.

20. The information processing device of claim 15, wherein the background process includes at least one of the following: block erase, patrol read, and refresh process.

* * * * *